US012707431B2

(12) United States Patent
Shin et al.

(10) Patent No.: US 12,707,431 B2
(45) Date of Patent: Aug. 11, 2026

(54) METHOD AND APPARATUS FOR SIDELINK POSITIONING IN WIRELESS COMMUNICATION SYSTEM

(71) Applicant: Samsung Electronics Co., Ltd., Gyeonggi-do (KR)

(72) Inventors: Cheolkyu Shin, Gyeonggi-do (KR); Hyunseok Ryu, Gyeonggi-do (KR); Kyoungmin Park, Gyeonggi-do (KR)

(73) Assignee: Samsung Electronics Co., Ltd (KR)

( * ) Notice: Subject to any disclaimer, the term of this patent is extended or adjusted under 35 U.S.C. 154(b) by 324 days.

(21) Appl. No.: 18/533,967

(22) Filed: Dec. 8, 2023

(65) Prior Publication Data

US 2024/0214981 A1 Jun. 27, 2024

(30) Foreign Application Priority Data

Dec. 22, 2022 (KR) ........................ 10-2022-0182207

(51) Int. Cl.

*H04W 64/00* (2009.01)
*H04L 5/00* (2006.01)
*H04W 72/25* (2023.01)
*H04W 92/18* (2009.01)

(52) U.S. Cl.

CPC ......... *H04W 64/006* (2013.01); *H04L 5/0051* (2013.01); *H04W 72/25* (2023.01); *H04W 92/18* (2013.01)

(58) Field of Classification Search

CPC .. H04L 5/0051; H04W 64/00; H04W 64/006; H04W 72/25; H04W 92/18

See application file for complete search history.

(56) References Cited

U.S. PATENT DOCUMENTS

2024/0049163 A1* 2/2024 Zhou ..................... H04W 76/14
2024/0049260 A1* 2/2024 Li ......................... H04L 5/0048

(Continued)

FOREIGN PATENT DOCUMENTS

WO WO 2022/032655 2/2022
WO WO 2022/180596 9/2022

(Continued)

OTHER PUBLICATIONS

LG Electronics, "Discussion on Potential Solutions for SL Positioning", R1-2211268, 3GPP TSG RAN WG1 Meeting #111, Nov. 14-18, 2022, 25 pages.

(Continued)

*Primary Examiner* — Kashif Siddiqui
(74) *Attorney, Agent, or Firm* — The Farrell Law Firm, P.C.

(57) ABSTRACT

The disclosure relates to a fifth generation (5G) or sixth generation (6G) communication system for supporting a higher data transmission rate. Provided is a method of identifying a location by using a positioning reference signal (PRS) by a first user equipment (UE) performing sidelink (SL) communication, including determining transmission resources of a first PRS and a second PRS, transmitting the first PRS by using at least one of the determined transmission resources, transmitting the second PRS by using at least one of the determined transmission resources, receiving, a third PRS, a first response time, and a second response time, acquiring a first round trip time (RTT) and a second RTT, calculating a time of flight (ToF) by using the first RTT, the second RTT, the first response time, and the second response time, and identifying the location of the first UE by using the calculated ToF, wherein the second PRS is transmitted after the first PRS is transmitted and before the third PRS is received.

12 Claims, 19 Drawing Sheets

(56) References Cited

U.S. PATENT DOCUMENTS

| | | | | |
|---|---|---|---|---|
| 2024/0137899 | A1* | 4/2024 | Thomas | H04W 64/00 |
| 2024/0155550 | A1* | 5/2024 | Dai | G01S 13/765 |
| 2025/0048316 | A1* | 2/2025 | Dai | H04W 64/00 |
| 2025/0164599 | A1* | 5/2025 | Wang | H04W 4/02 |
| 2025/0168805 | A1* | 5/2025 | Li | H04B 17/328 |
| 2025/0175938 | A1* | 5/2025 | Xu | H04W 64/003 |
| 2025/0220633 | A1* | 7/2025 | Li | H04W 72/04 |
| 2025/0374224 | A1* | 12/2025 | Ko | H04W 72/25 |

FOREIGN PATENT DOCUMENTS

| | | |
|---|---|---|
| WO | WO 2022/205307 | 10/2022 |
| WO | WO 2022/213352 | 10/2022 |

OTHER PUBLICATIONS

NTT DOCOMO, Inc., “Discussion on Potential Solutions for SL Positioning”, R1-2211988, 3GPP TSG RAN WG1 #111, Nov. 14-18, 2022, 16 pages.

Huawei, HiSilicon, “Remaining Issues for SL Positioning Solutions”, R1-2210901, 3GPP TSG-RAN WG1 Meeting #111, Nov. 14-18, 2022, 15 pages.

LG Electronics, “Discussion on OFDM based Carrier Phase Measurement in NR”, R1-2207360, 3GPP TSG RAN WG1 #110, Aug. 22-26, 2022, 9 pages.

International Search Report dated Mar. 22, 2024 issued in counterpart application No. PCT/KR2023/019833, 8 pages.

IEEE Standard for Wireless Medium Access Control (MAC) and Physical Layer (PHY) Specifications for Peer Aware Communications (PAC), IEEE Std 802.15.8™—2017, pp. 322.

Sang, Cung Lian et al., “Numerical and Experimental Evaluation of Error Estimation for Two-Way Ranging Methods”, Sensors 2019, 19, 616; doi:10.3390/s19030616, pp. 28.

IEEE Standard for Local and metropolitan area networks—Part 15.4: Low-Rate Wireless Personal Area Networks (LR-WPANs), IEEE Std 802.15.4™—2011 (Revision of IEEE Std 802.15.4-2006), pp. 314.

European Search Report dated Jan. 9, 2026 issued in counterpart application No. 23907506.2-1206, 9 pages.

* cited by examiner

Inter-cell V2X communication scenario (a)

(b)

METHOD AND APPARATUS FOR SIDELINK POSITIONING IN WIRELESS COMMUNICATION SYSTEM

CROSS-REFERENCE TO RELATED APPLICATION(S)

This application is based on and claims priority under 35 U.S.C. § 119 to Korean Patent Application No. 10-2022-0182207, filed on Dec. 22, 2022, in the Korean Intellectual Property Office, the disclosure of which is incorporated herein by reference in its entirety.

BACKGROUND

1. Field

The disclosure relates generally to a wireless communication system and, more particularly, to a method and an apparatus for performing location measurement and location identifying through a sidelink (SL) in the wireless communication system.

2. Description of Related Art

Fifth generation (5G) mobile communication technologies define broad frequency bands such that high transmission rates and new services are possible, and can be implemented not only in sub 6 gigahertz (GHz) bands such as 3.5 GHz, but also in above 6 GHz bands referred to as millimeter wave (mmWave) including 28 GHz and 39 GHz. In addition, it has been considered to implement sixth generation (6G) mobile communication technologies (referred to as Beyond 5G systems) in terahertz (THz) bands such as 95 GHz to 3 THz bands, to accomplish transmission rates fifty times faster than 5G mobile communication technologies and ultra-low latencies one-tenth of 5G.

Since the initial stage of 5G mobile communication technologies, in order to support services and to satisfy performance requirements in connection with enhanced mobile broadband, (eMBB), ultra reliable & low latency communications (URLLC), and massive machine-type communications (mMTC), there has been ongoing standardization regarding beamforming and massive multiple input multiple output (MIMO) for alleviating radio-wave path loss and increasing radio-wave transmission distances in mmWave, numerology (e.g., operating multiple subcarrier spacings) for efficiently utilizing mmWave resources and dynamic operation of slot formats, initial access technologies for supporting multi-beam transmission and broadbands, definition and operation of a bandwidth part (BWP), new channel coding methods such as a low density parity check (LDPC) code for large-capacity data transmission and a polar code for highly reliable transmission of control information, layer 2 (L2) pre-processing, and network slicing for providing a dedicated network customized to a specific service.

Discussions are ongoing regarding improvement and performance enhancement of initial 5G mobile communication technologies in view of services to be supported by 5G mobile communication technologies, and there has been physical layer standardization regarding technologies such as vehicle-to-everything (V2X) for aiding driving determination by autonomous vehicles based on information regarding positions and states of vehicles transmitted by the vehicles and for enhancing user convenience, new radio unlicensed (NR-U) aimed at system operations conforming to various regulation-related requirements in unlicensed bands, NR user equipment (UE) power saving, non-terrestrial network (NTN) which is UE-satellite direct communication for securing coverage in an area in which communication with terrestrial networks is impossible, and positioning.

Moreover, there has been ongoing standardization in wireless interface architecture/protocol fields regarding technologies such as industrial Internet of things (IIoT) for supporting new services through interworking and convergence with other industries, integrated access and backhaul (IAB) for providing a node for network service area expansion by supporting a wireless backhaul link and an access link in an integrated manner, mobility enhancement including conditional handover and dual active protocol stack (DAPS) handover, and two-step random access for simplifying random access procedures (2-step RACH for NR). There also has been ongoing standardization in system architecture/service fields regarding a 5G baseline architecture or service based interface for combining network functions virtualization (NFV) and software-defined networking (SDN) technologies, and mobile edge computing (MEC) for receiving services based on UE positions.

If such 5G mobile communication systems are commercialized, it is expected that the number of devices that will be connected to communication networks will exponentially increase. Thus, it is anticipated that enhanced functions and performances of 5G mobile communication systems and integrated operations of connected devices will be necessary. To this end, new research is scheduled in connection with extended reality (XR) for efficiently supporting augmented reality (AR), virtual reality (VR), mixed reality (MR), etc., (XR=AR+VR+MR), 5G performance improvement and complexity reduction by utilizing artificial intelligence (AI) and machine learning (ML), AI service support, metaverse service support, and drone communication.

Such development of 5G mobile communication systems will serve as a basis for developing not only new waveforms for securing coverage in THz bands of 6G mobile communication technologies, full dimensional MIMO (FD-MIMO), multi-antenna transmission technologies such as array antennas and large-scale antennas, metamaterial-based lenses and antennas for improving coverage of THz band signals, high-dimensional space multiplexing technology using orbital angular momentum (OAM), and reconfigurable intelligent surface (RIS), but also full-duplex technology for increasing frequency efficiency of 6G mobile communication technologies and improving system networks, AI-based communication technology for implementing system optimization by utilizing satellites and AI from the design stage and internalizing end-to-end AI support functions, and next-generation distributed computing technology for implementing services at levels of complexity exceeding the limit of UE operation capability by utilizing ultra-high-performance communication and computing resources are being developed.

The demand for a mobile service is continuously increasing, and a location-based service (LBS) managed by two main requirements corresponding to an emergency service and a commercial application is rapidly growing.

A plurality of services can be provided to users in a communication system, and a method of providing respective services according to characteristics within the same time section and an apparatus using the same are required to provide the plurality of services to the users. Various services provided in a 5G communication system are being researched, such as a service that satisfies requirements of low latency and high reliability.

In an NR SL system, unicast communication, groupcast (or multicast) communication, and broadcast communication between UEs are supported. Unlike an LTE SL which is directed to transmitting and receiving basic safety information required for driving a vehicle, an NR sidelink is directed to providing more evolved services, such as platooning, advanced driving, extended sensor, and remote driving.

Particularly, in the NR SL, positioning (location measurement) may be performed through an SL between UEs, such that a method of measuring the location of the UE using a positioning signal transmitted through the SL may be considered. A method of measuring the location of the UE using a positioning signal transmitted through the existing uplink (UL) and downlink (DL) of the UE and the BS can be used only when the UE is within the BS coverage. However, when SL positioning is introduced, the location of the UE can be measured even when the UE is outside the BS coverage.

It is necessary to define a procedure for performing a round trip time (RTT) in the SL. To ensure SL positioning accuracy, there is a need in the art to newly design a method of transmitting an SL positioning reference signal (PRS) (S-PRS).

As such, there is a need in the art for a method and device to perform positioning, including location measurement or location identifying, through an SL.

SUMMARY

This disclosure has been made to address at least the above-mentioned problems and/or disadvantages and to provide at least the advantages described below.

Accordingly, an aspect of the disclosure is to provide methods using an RTT to perform positioning through an SL.

An aspect of the disclosure is to provide a physical layer structure corresponding to when the S-PRS is transmitted, which differs from the existing structure in the prior art.

An aspect of the disclosure is to provide a method and apparatus by which to exchange information required for performing the RTT between SL UEs, such that positioning can be performed in the SL.

In accordance with an aspect of the disclosure, a method of identifying a location by using a PRS by a first UE performing SL communication includes determining transmission resources of a first PRS and a second PRS, transmitting the first PRS by using at least one of the determined transmission resources, transmitting the second PRS by using at least one of the determined transmission resources, receiving, from a second UE by which the first PRS and the second PRS are received, a third PRS, a first response time, and a second response time, wherein the first response time is corresponding to a difference between a time point at which the first PRS is received and a time point at which the third PRS is transmitted and the second response time is corresponding to a difference between a time point at which the second PRS is received and a time point at which the third PRS is transmitted, acquiring a first RTT and a second RTT, wherein the first RTT corresponds to a difference between a time point at which the first PRS is transmitted and a time point at which the third PRS is received and the second RTT corresponds to a difference between a time point at which the second PRS is transmitted and a time point at which the third PRS is received, calculating a time of flight (ToF) by using the first RTT, the second RTT, the first response time, and the second response time, and identifying the location of the first UE by using the calculated ToF, wherein the second PRS is transmitted after the first PRS is transmitted and before the third PRS is received.

In accordance with an aspect of the disclosure, a method of identifying a location by using a PRS by a first UE performing SL communication includes determining a transmission resource of a first PRS, transmitting the first PRS by using the determined transmission resource, receiving, from a second UE by which the first PRS is received, a second PRS and a first response time, wherein the first response time is corresponding to a difference between a time point at which the first PRS is received and a time point at which the second PRS is transmitted, receiving, from the second UE, a third PRS and a second response time, wherein the second response time is corresponding to a difference between a time point at which the first PRS is received and a time point at which the third PRS is transmitted, acquiring a first RTT and a second RTT, wherein the first RTT is corresponding to a difference between a time point at which the first PRS is transmitted and a time point at which the second PRS is received and the second RTT is corresponding to a difference between the time point at which the first PRS is transmitted and a time point at which the third PRS is received, calculating a ToF by using the first RTT, the second RTT, the first response time, and the second response time, and identifying the location of the first UE by using the calculated ToF, wherein the second PRS is received after the first PRS is transmitted and before the third PRS is received.

In accordance with an aspect of the disclosure, a first UE identifying a location by using includes a transceiver and a processor, wherein the processor is configured to control the transceiver to determine transmission resources of a first PRS and a second PRS, transmit the first PRS by using at least one of the determined transmission resources, transmit the second PRS by using at least one of the determined transmission resources, receive, from a second UE by which the first PRS and the second PRS are received, a third PRS, a first response time, and a second response time, wherein the first response time is corresponding to a difference between a time point at which the first PRS is received and a time point at which the third PRS is transmitted and the second response time is corresponding to a difference between a time point at which the second PRS is received and a time point at which the third PRS is transmitted, acquire a first RTT and a second RTT, wherein the first RTT is corresponding to a difference between a time point at which the first PRS is transmitted and a time point at which the third PRS is received and the second RTT is corresponding to a difference between a time point at which the second PRS is transmitted and a time point at which the third PRS is received, calculate a ToF by using the first RTT, the second RTT, the first response time, and the second response time, and identify the location of the first UE by using the calculated ToF, and wherein the processor is configured to transmit the second PRS after the first PRS is transmitted and before the third PRS is received.

In accordance with an aspect of the disclosure, a first UE identifying a location by using PRS, the first UE including a transceiver and a processor, wherein the processor is configured to control the transceiver to determine a transmission resource of a first PRS, transmit the first PRS by using the determined transmission resource, receive, from a second UE by which the first PRS is received, a second PRS and a first response time, wherein the first response time is corresponding to a difference between a time point at which the first PRS is received and a time point at which the second PRS is transmitted, receive, from the second UE, a third PRS and a second response time, wherein the second response time is corresponding to a difference between a time point at which the first PRS is received and a time point at which the third PRS is transmitted, acquire a first RTT and a second RTT, wherein the first RTT is corresponding to a difference between a time point at which the first PRS is transmitted and a time point at which the second PRS is received and the second RTT is corresponding to a difference between the time point at which the first PRS is transmitted and a time point at which the third PRS is received, calculate a ToF by using the first RTT, the second RTT, the first response time, and the second response time, and identify the location of the first UE by using the calculated ToF, and wherein the second PRS is received after the first PRS is transmitted and before the third PRS is received.

BRIEF DESCRIPTION OF THE DRAWINGS

The above and other aspects, features, and advantages of certain embodiments of the disclosure will be more apparent from the following detailed description taken in conjunction with the accompanying drawings, in which.

DETAILED DESCRIPTION

Figure 1A:
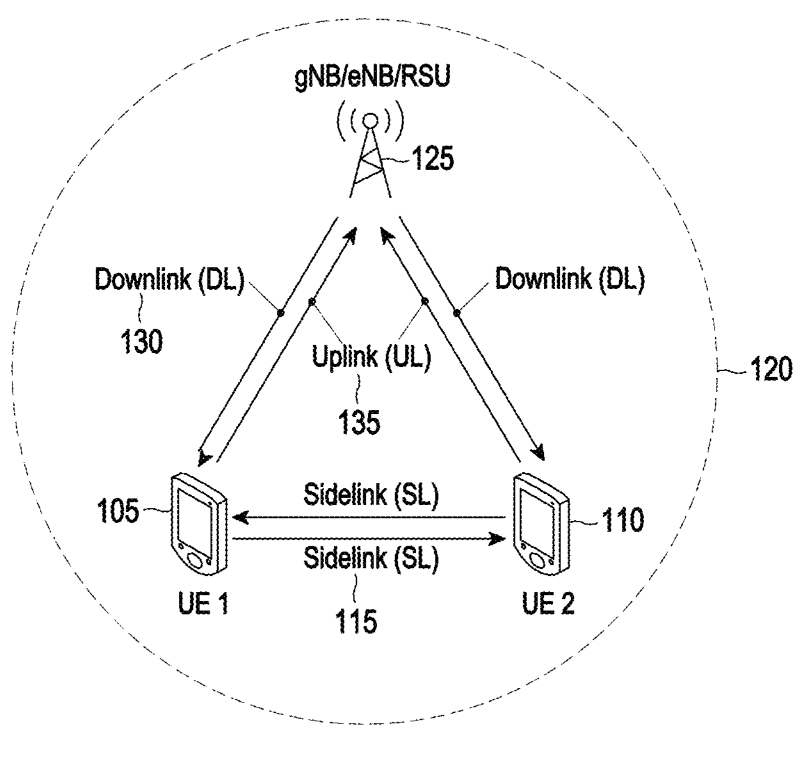
FIG. 1A illustrates a system according to an embodiment.

The following description with reference to the accompanying drawings is provided to assist in a comprehensive understanding of embodiments of the present disclosure. Accordingly, those of ordinary skill in the art will recognize that various changes and modifications of the embodiments described herein can be made without departing from the scope and spirit of the present disclosure. Descriptions of well-known functions and constructions may be omitted for the sake of clarity and conciseness.

In the accompanying drawings, some elements may be exaggerated, omitted, or schematically illustrated. Furthermore, the size of each element does not completely reflect the actual size, and identical or corresponding elements are provided with identical reference numerals.

The advantages and features of the disclosure and manners to achieve them will be apparent by making reference to embodiments as described below in detail in conjunction with the accompanying drawings. However, the disclosure is not limited to the embodiments set forth below, but may be implemented in various different forms. The following embodiments are provided only to completely disclose the disclosure and inform those skilled in the art of the scope of the disclosure. Throughout the specification, the same or like reference numerals designate the same or like elements.

Herein, a unit refers to a software element or a hardware element, such as a field programmable gate array (FPGA) or an application specific integrated circuit (ASIC), which performs a predetermined function. However, the unit does not always have a meaning limited to software or hardware and may be constructed either to be stored in an addressable storage medium or to execute one or more processors. Therefore, the unit includes, for example, software elements, object-oriented software elements, class elements or task elements, processes, functions, properties, procedures, subroutines, segments of a program code, drivers, firmware, micro-codes, circuits, data, database, data structures, tables, arrays, and parameters. The elements and functions provided by the unit may be either combined into fewer elements, or a unit, or divided into more elements, or a unit. Moreover, the elements and units or may be implemented to reproduce one or more central processing units (CPUs) within a device or a security multimedia card and the unit may include one or more processors.

The following description is directed to new radio access network (RAN) and a packet core as a core network (5G system, 5G core network, or new generation core (NG Core)) which are specified in the 5G mobile communication standards define[d] by the 3rd generation partnership project long term evolution (3GPP LTE) that is a mobile communication standardization group, but the disclosure may be applied to other communication systems having similar backgrounds or channel types through some modifications without significantly departing from the scope of the disclosure.

In the following description, terms for identifying access nodes and for referring to network entities, messages, interfaces between network entities, and various identification information, are illustratively used for the sake of convenience. Therefore, the disclosure is not limited by the terms as used below, and other terms referring to subjects having equivalent technical meanings may be used.

Disclosed herein is a positioning method using an RTT in an SL. A positioning signal in the SL may be referred to as an S-PRS or an SL-PRS. However, it should be noted that another term may be used.

FIG. 1A illustrates a system according to an embodiment.

In FIG. 1A, UE-1 105 and UE-2 110 communicating through the SL 115 are located within the in-coverage (IC) area 120 of a base station (BS) 125 (e.g., a gNB, an eNB, or a road side unit (RSU)). All UEs may receive data and control information from the BS through the DL 130 or transmit data and control information to the BS through the UL 135. The data and control information may be for SL communication and may be data and control information for general cellular communication. The UEs may transmit/receive data and control information for corresponding communication through the SL.

Figure 1B:
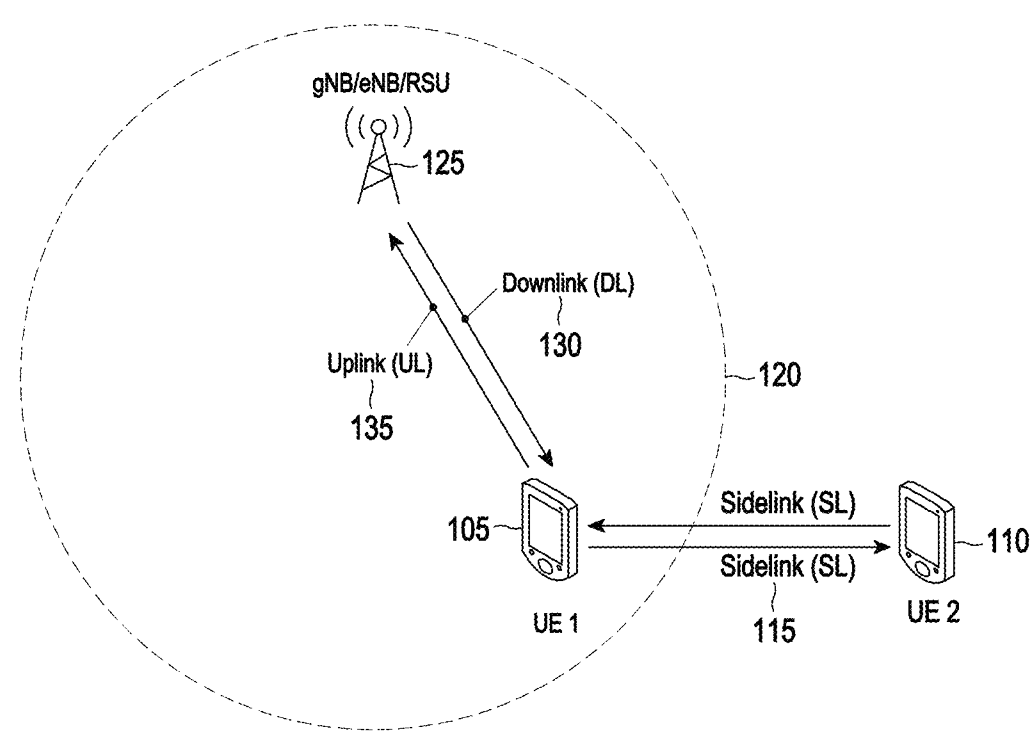
FIG. 1B illustrates a system according to an embodiment.

FIG. 1B illustrates a system according to an embodiment.

In FIG. 1B, UE-1 105 is located within the coverage of the BS 125 and UE-2 110 is located outside the coverage of the BS among the UEs in FIG. 1B. That is, FIG. 1B illustrates an example of a partial coverage (PC) in which one or more UEs such as UE-2 110 are located outside the coverage 120 of the BS 125. UE-1 105 located within the BS 125 coverage 120 may receive data and control information from the BS 125 through the DL 130 or transmit data and control information to the BS 125 through the UL 135. UE-2 110 located outside the coverage 120 of the BS 125 cannot receive data and control information from the BS through the DL 130 and cannot transmit data and control information to the BS through the UL 135. UE-2 110 may transmit/receive data and control information for corresponding communication through the SL 115.

Figure 1C:
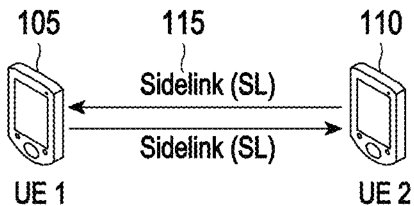
FIG. 1C illustrates a system according to an embodiment.

FIG. 1C illustrates a system according to an embodiment.

FIG. 1C illustrates an example of when all UEs are located outside (out of coverage (OOC)) 145 of the BS 125. Accordingly, UE1-1 105 and UE-2 110 cannot receive data and control information from the BS through the DL and cannot transmit data and control information to the BS through the UL. UE-1 105 and UE-2 110 may transmit/receive data and control information through the SL 115.

Figure 1D:
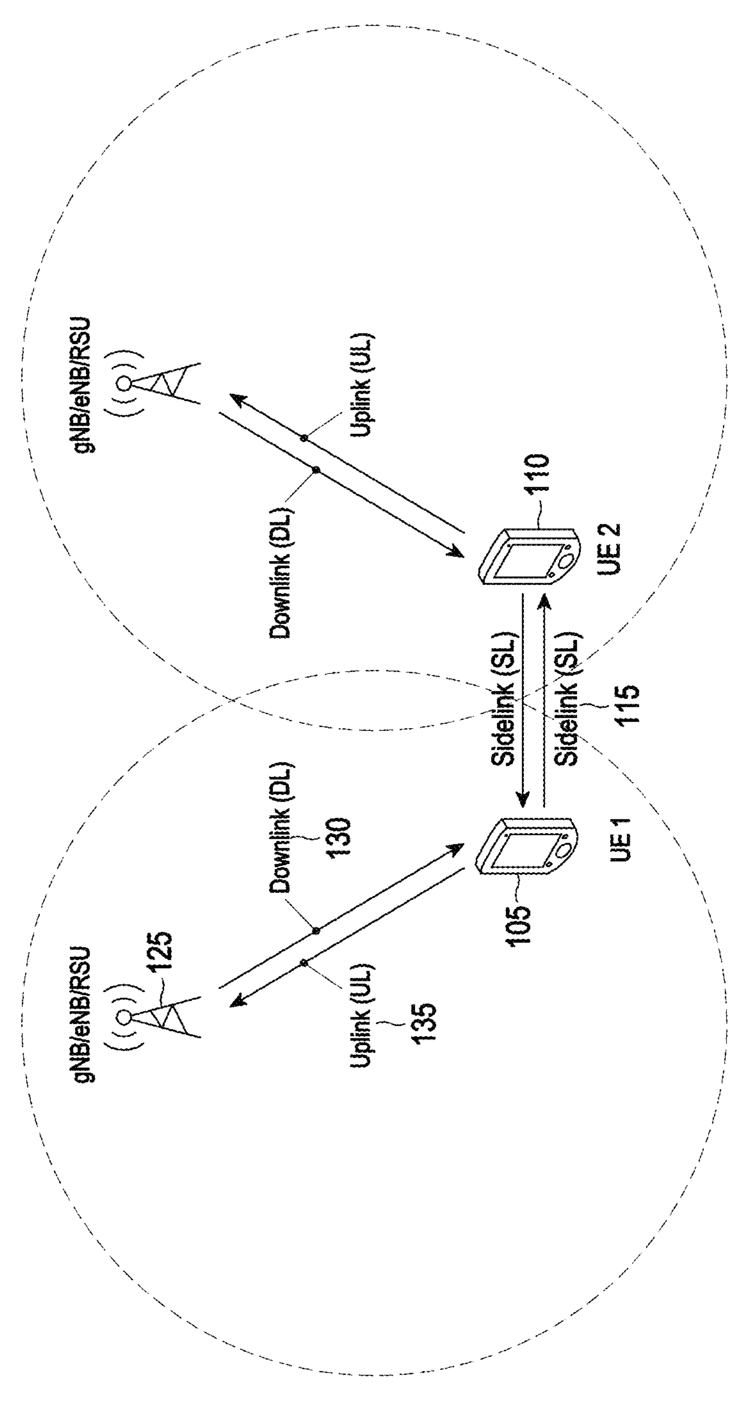
FIG. 1D illustrates a system according to an embodiment.

FIG. 1D illustrates a system according to an embodiment.

FIG. 1D illustrates when UE-1 105 and UE-2 110 located in different cells perform SL communication and access different BSs in a radio resource control (RRC)-connected state or camp on the BSs in an RRC connection-released state, that is, RRC idle state. In the SL 115, UE-1 105 may be a transmission UE and UE-2 110 may be a reception UE. Alternatively, UE-1 105 may be a reception UE and UE-2 110 may be a transmission UE. UE-1 105 may receive a system information block (SIB) from the BS 125, which the UE-1 105 accesses or camps on, and the UE-2 110 may receive an SIB from another BS, which the UE-2 110 accesses or camps on.

For the SIB, the existing SIB or a separately defined SIB for sidelink communication may be used, and information on the SIB received by UE-1 105 may be different from information on the SIB received by UE-2 110. Accordingly, for SL communication between UE-1 105 and UE-2 110 located in different cells, information may be integrated or a method of analyzing SIB information transmitted from different cells through signaling of the information may be needed.

FIGS. 1A to 1D illustrate SL systems including UE-1 105 and UE-2 110 for convenience of description, but the disclosure is not limited thereto and communication may be performed between more UEs. The UL 135 and the DL 130 between the BS 125 and the UEs 105, 110 may be referred to as Uu interfaces, and SL communication between the UEs 105, 110 may be referred to as a PC5 interface. Accordingly, the terms may be interchangeably used in the disclosure.

Herein, the UE may be a general UE and a UE supporting V2X. Specifically, the UE may be a handset (for example, a smartphone) of a pedestrian, or may include a vehicle supporting communication between vehicles (vehicle-to-vehicle (V2V)), a vehicle supporting communication between a vehicle and a pedestrian (vehicle-to-pedestrian (V2P)), a vehicle supporting communication between a vehicle and a network (vehicle-to-network (V2N)), or a vehicle supporting communication between a vehicle and infrastructure (vehicle-to-infrastructure (V2I)). The UE may include an RSU having UE functions, BS functions, or some BS functions and some UE functions. The BS may be a BS supporting both of V2X communication and general cellular communication or a BS supporting only V2X communication. The BS may be a 5G BS (e.g., a gNB), a 4G BS (e.g., an eNB), or an RSU.

Figure 2:
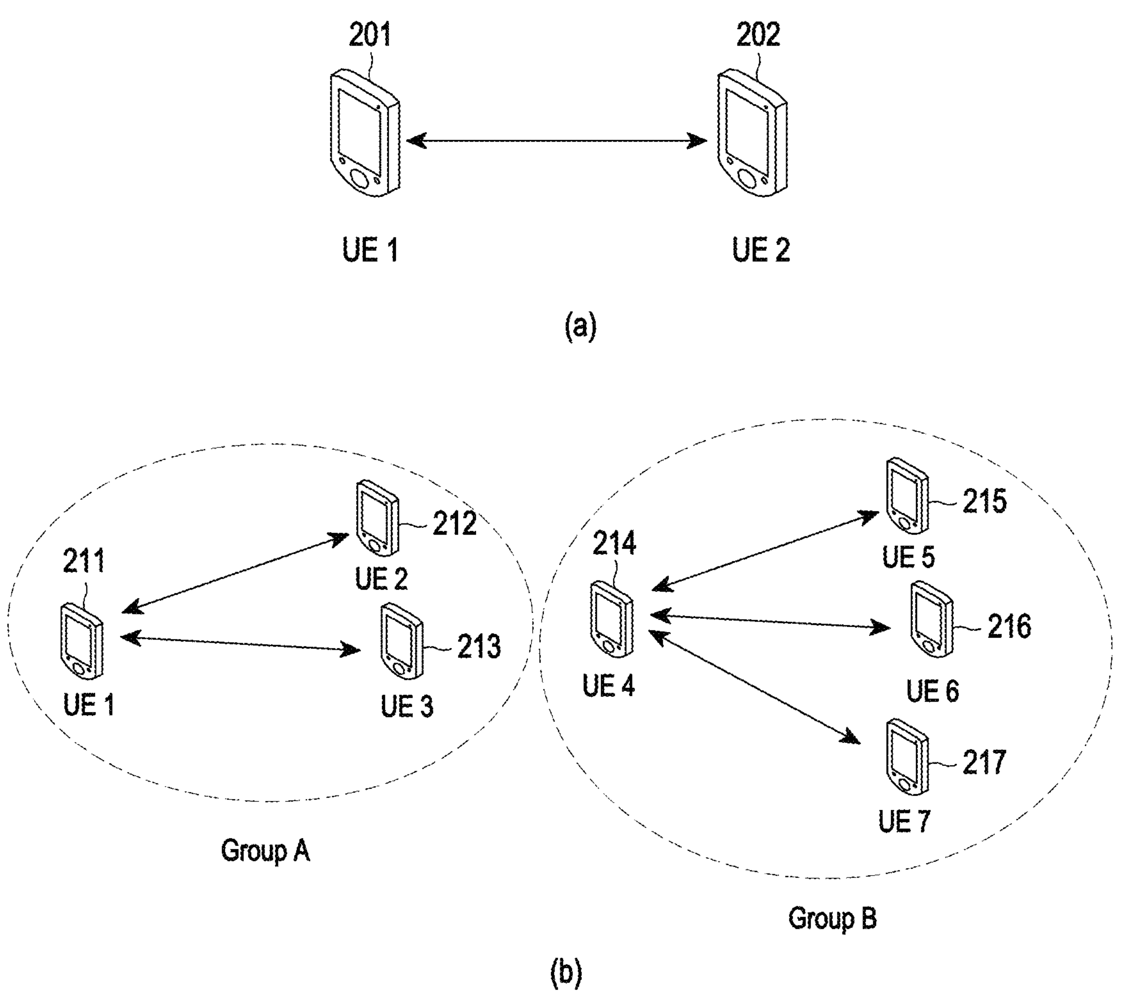
FIG. 2 illustrates a communication method performed through an SL according to an embodiment.

FIG. 2 illustrates a communication method performed through the SL according to an embodiment.

Referring to section (a) in FIG. 2, UE-1 201 (e.g., a TX UE) and UE-2 202 (e.g., an RX UE) may perform one-to-one communication, which may be referred to as unicast communication. In the SL, capability information and configuration information may be exchanged between UEs through PC5-RRC defined in a unicast link between UEs. Configuration information may be exchanged through an SL medium access control (MAC) control element (CE) defined in the unicast link between UEs. The configuration information may include information on a destination ID and a source ID. The methods of exchanging information for unicast are not limited to the PC5-RRC and the MAC-CE. Relevant information may be included in SL control information (SCI) ($1^{st}$ SCI or $2^{nd}$ SCI). Some of the corresponding information may be inserted into the SCI and then transmitted, and the remaining information may be inserted into another channel and then transmitted through PC5-RRC or MAC-CE.

Referring to section (b) in FIG. 2, a TX UE and an RX UE may perform one-to-many communication, which may be referred to as groupcast or multicast. UE-1 211, UE-2 212, and UE-3 213 may configure one group (group A) and perform groupcast communication, and UE-4 214, UE-5 215, UE-6 216, and UE-7 217 may configure another group (group B) and perform groupcast communication. Each UE may perform groupcast communication only within the group to which the UE belongs, and communication between different groups may be performed through unicast, groupcast, or broadcast communication. FIG. 2B illustrates that two groups (group A and group B) are configured, but the disclosure is not limited thereto.

In FIG. 2, UEs may perform broadcast communication in the SL. Broadcast communication may indicate when one or more other UEs can receive data and control information transmitted by a transmission UE through the SL. For example, when it is assumed that UE-1 211 is a transmission UE for broadcast, UE-2 212, UE-3 213, UE-4 214, UE-5 215, UE-6 216, and UE-7 217 may receive data and control information transmitted by UE-1 211.

In NR V2X, supporting the type in which a vehicle UE transmits data only to one specific node through unicast and the type in which the vehicle UE transmits data to a plurality of specific nodes through groupcast may be considered unlike in LTE V2X. For example, the unicast and groupcast technologies may be useful in consideration of a service scenario such as platooning, which is a technology in which two or more vehicles are connected through one network and move in a cluster form. Unicast communication may be required for a leader node of a group connected through group driving to control one specific node, and group cast communication may be required to simultaneously control a group including a plurality of specific nodes.

Figure 3:
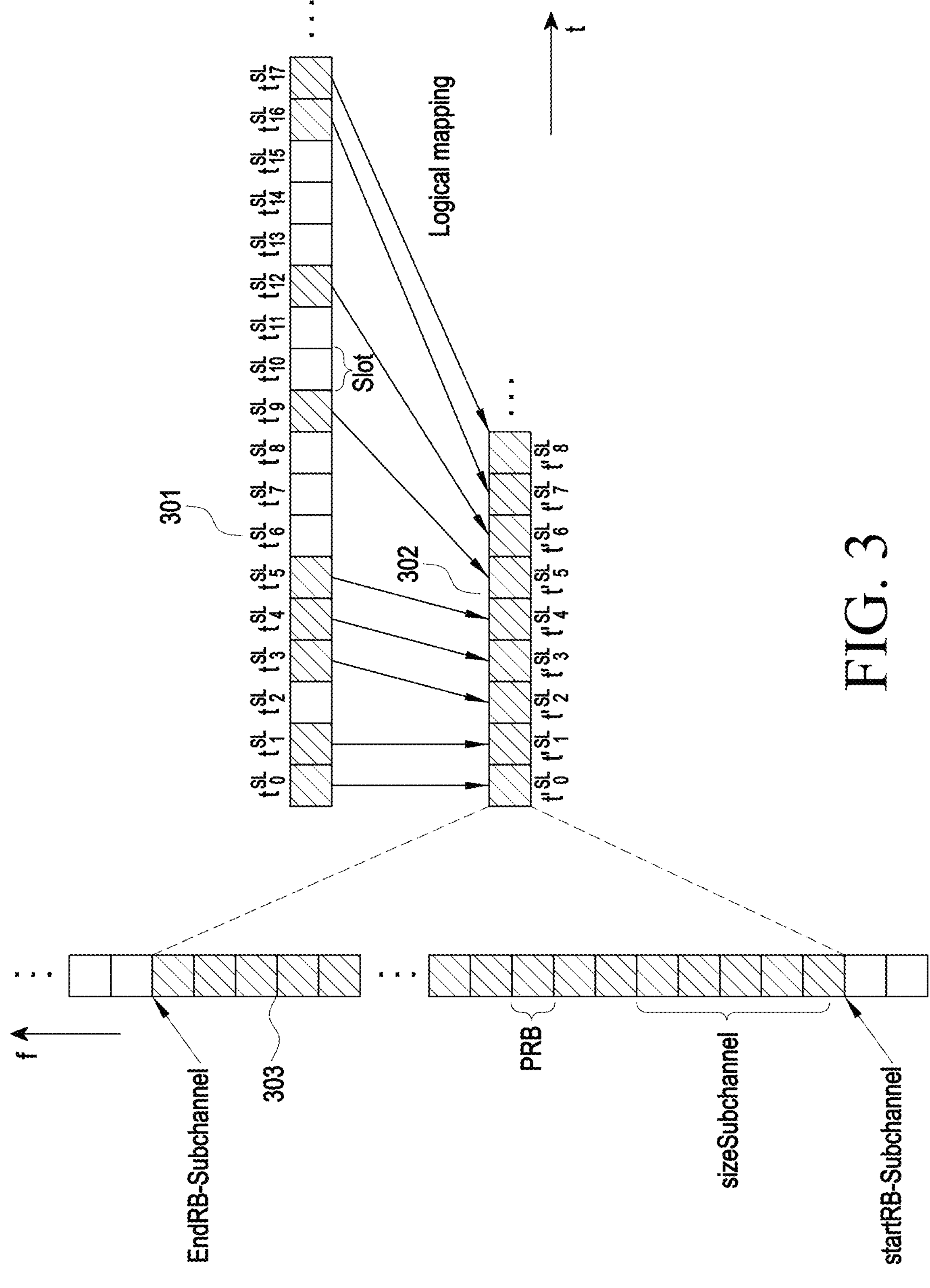
FIG. 3 illustrates a resource pool defined as a set of resources in the time and frequency used for transmission and reception of the SL according to an embodiment.

FIG. 3 illustrates a resource pool defined as a set of resources in the time and the frequency used for SL transmission and reception according to an embodiment.

In the resource pool, a resource allocation unit (resource granularity) in the time axis may be a slot. A resource allocation unit in the frequency axis may be a sub-channel including one or more physical resource blocks (PRBs). Herein, when resource pools are non-consecutively allocated in the time is described as an example, but the resource pools may be consecutively allocated in the time. An example of when resource pools are consecutively allocated in the frequency is described, but a method of non-consecutively allocating the resource pools in the frequency is not excluded.

FIG. 3 illustrates a case 301 in which resource pools are non-consecutively allocated in the time axis.

Referring to FIG. 3, granularity of resource allocation in the time is a slot. An SL slot may be defined within a slot used as the UL. Specifically, within one slot, the length of symbols used as the SL may be configured as SL BWP information. Accordingly, among the slots used as the UL, slots in which the length of symbols configured as the SL is not ensured cannot be the SL slots. A slot for transmitting an SL synchronization signal block (S-SSB) is excluded from the slots belonging to the resource pool. Referring to the slots 301 in the time axis in FIG. 3, except for the slots which cannot be the SL slots, a set of slots which can be used as the SL in the time is $$t_0^{SL}, t_1^{SL}, t_2^{SL}, \ldots$$

Parts of the slots 301 including dashed lines represent SL slots belonging to the resource pool. The SL slots belonging to the resource pool may be (pre-)configured as resource pool information through a bitmap. Logically, referring to mapped slots 302, a set of SL slots belonging to the resource pool in the time axis is $$t_0'^{SL}, t_1'^{SL}, t_2'^{SL}, \ldots$$

Herein, (pre-)configuration may indicate configuration information preconfigured and prestored in the UE or when the UE is configured by the BS through a cell-common manner. The term "cell-common" may indicate that UEs in the cell receive a configuration of the same information from the BS. A method by which the UE receives an SL-SIB from the BS and acquires cell-common information may be considered. The term (pre-) configuration may indicate when the UE is configured in a UE-specific manner after the RRC connection with the BS. The term UE-specific may be replaced with the term UE-dedicated and may indicate that every UE receives configuration information having a specific value. A method in which the UE may receive an RRC message from the BS and acquires UE-specific information may be considered.

The (pre-) configuration of SL slots belonging to the resource pool may consider a method of configuring or not configuring the SL slots in the resource pool information.

When the SL slots are (pre-)configured as resource pool information, all the UEs operating in the corresponding resource pool may be operated by common configuration information except for a UE-specific configuration after the RRC connection between the UE and the BS is established.

The method of not configuring the (pre-)configuration in the resource pool information is a method of configuring the same independently from the resource pool configuration information by default. For example, one or more modes are (pre-)configured in the resource pool (for example, A, B, and C) and which mode (for example, A, B, or C) among the modes (pre-)configured in the resource pool may be indicated through information (pre-)configured independently from the resource pool configuration information. The (pre-) configuration may be configured through PC5-RRC in SL unicast transmission. Unlike this, a method of configuring the (pre-)configuration through the MAC-CE may be considered. In the disclosure, it is noted that the (pre-)configuration may be applied to all the above-described cases.

Referring to resources 303 of the frequency axis in FIG. 3, when resource pools are consecutively allocated in the frequency. In the frequency axis, resource allocation may be configured by BWP information and performed in units of sub-channels. The sub-channel may be defined as a resource allocation unit in the frequency axis including one or more PRBs. That is, the sub-channel may be defined as an integer multiple of the PRB. For resources 303, the sub-channel may be configured as 5 consecutive PRBs, and the sub-channel size (sizeSubchannel) may be the size of 5 consecutive PRBs. However, this is merely an example, and the size of the sub-channel may be variously configured, and one sub-channel is generally configured by consecutive PRBs but the configuration of consecutive PRBs is not necessary. The sub-channel may be a basic unit of resource allocation for a physical sidelink shared channel (PSSCH). For 303, startRB-Subchannel may represent a start location of the sub-channel in the frequency in the resource pool. When resource allocation is performed in units of sub-channels in the frequency axis, resources in the frequency may be allocated through configuration information such as a resource block (RB) index (startRB-Subchannel) at which the sub-channel starts, information (sizeSubchannel) indicating how many PRBs are included in the sub-channel, and the total number (numSubchannel) of sub-channels. Information on at least one of startRB-Subchannel, sizeSubchannel, or numSubchannel may be (pre-)configured as resource pool information in the frequency.

One of the methods of allocating transmission resources in the SL is a method of receiving allocation of sidelink transmission resources from the BS when the UE is within the BS coverage referred to herein as mode 1. In other words, mode 1 is a scheduling scheme dedicated for UEs with which the BS has the RRC-connection and may be a method of allocating resources used for sidelink transmission. In mode 1, the BS may manage SL resources, and thus the method may be effective to manage interference and the resource pool. Unlike this, among the methods of allocating transmission resources in the SL, there is a method by which the UE allocates transmission resources in the SL through direct sensing, referred to herein as mode 2. Method 2 may also be referred to as UE autonomous resource selection. Unlike mode 1 in which the BS is directly involves in resource allocation, the transmission UE may autonomously select resources through a sensing and resource selection procedure based on the (pre-)configured resource pool and transmit data through the selected resources in mode 2.

When transmission resources are allocated through mode 1 or mode 2, the UE may transmit/receive data and control information through the SL. The control information may include SCI format 1-A in 1$^{st}$ stage SCI transmitted through a physical SL control channel (PSCCH). The control information may include at least one of SCI format 2-A or SCI format 2-B in 2$^{nd}$ stage SCI transmitted through a PSSCH.

Hereinafter, a method using a positioning signal or a PRS transmitted through the DL and the UL of the UE and the BS is described as a positioning method of measuring the location of the UE.

Herein, the method using the positioning signal transmitted through the DL and the UL of the UE and the BS may be referred to as radio access technology (RAT)-dependent positioning. Other positioning methods may be classified as RAT-independent positioning. Specifically, in the case of an LTE system, methods, such as observed time difference of arrival (OTDOA), UL time difference of arrival (UTDOA), and enhanced cell identification (E-CID), may be used as the RAT-dependent positioning scheme. In the case of an NR system, methods, such as DL time difference of arrival (DL-TDOA), DL angle-of-departure (DL-AOD), multi-RTT, NR E-CID, UL time difference of arrival (UL-TDOA), and UL angle-of-arrival (UL-AOA), may be used as the RAT-dependent positioning scheme. Unlike this, the RAT-independent positioning scheme may include methods such as assisted global navigation satellite systems (A-GNSS), sensor, wireless local area network (WLAN), and Bluetooth™.

The disclosure is directed to the RAT-dependent positioning method supported through the SL. In the case of an interface between the BS and UEs (the UL and the DL, hereinafter, referred to as Uu), the RAT-dependent positioning is possible only when the UE is within the BS coverage. However, it is noted that the RAT-dependent positioning of the SL is not limited to when the UE is within the BS coverage. In the case of the RAT-dependent positioning in Uu, positioning protocols, such as an LTE positioning protocol (LPP), an LTE positioning protocol annex (LPPa), and NR positioning protocol annex (NRPPa), may be used. The LPP is a positioning protocol defined between the UE and a location server (LS), and the LPPa and the NRPPa are protocols defined between the BS and the location server. The location server may perform a location management function (LMF) as an entity for managing location measurement. The location server may be referred to as an LMF or may have another name.

Both the LTE and NR systems may support the LPP, and roles for positioning including exchanging positioning capability, transmitting assistance data, transmitting location information, process error, and/or aborting may be performed through the LPP.

The BS enables the UE and the location server to exchange positioning information when the UE and the location server play the above roles through the LPP. Exchange of the position information through the LPP may be performed to be BS transparent. This may indicate that the BS is not involved in exchange of the positioning information between the UE and the location server.

In the case of exchange of the positioning capability, positioning information which can be supported by the UE may be exchanged with the location server. For example, the positioning information which can be supported by the UE may indicate whether a positioning method supported by the UE is one or both of a UE-assisted and UE-based method. The UE-assisted method is a scheme in which the UE does not directly measure the absolute location of the UE and transfers only a measurement value for the positioning scheme, based on the applied and received positioning signal to the location server, and the location server calculates the absolute location (position) of the UE. The absolute location may be two-dimensional (x, y) and three-dimensional (x, y, z) coordinate location information of the UE by longitude and latitude. Unlike this, the UE-based method may be a scheme in which the UE directly measure the absolute location of the UE and, for this, the UE may be required to receive both the positioning signal and location information of an entity which transmits the positioning signal.

While only the UE-assisted scheme is supported in the LTE system, all positioning based on the UE-assisted and UE-based schemes may be supported in the NR system. Assistance data transmission may be a very important element in positioning to measure the accurate location of the UE. Specifically, in the case of assistance data transmission, the location server may provide configuration information for the positioning signal, a candidate cell to receive the positioning signal, and transmission reception point (TRP) information to the UE. When DL-TDOA is used, the candidate cell to receive the positioning signal and the TRP information may be information on a reference cell, a reference TRP, a neighbor cell, and a neighbor TRP. A plurality of candidates for the neighbor cell and the neighbor TRP may be provided, and information indicating which cell and TRP are selected to measure the positioning signal may also be provided. In order to measure the accurate location, the UE is required to select the candidate cell and TRP information which are the reference. For example, a channel for the positioning signal received from the corresponding candidate cell and the TRP is a line-of-site (LOS) channel, in other words, a channel having fewer non-LOS (NLOS) channel components have the higher accurate positioning measurement. Accordingly, when the location service provides the candidate cell and the TRP information which are the reference for performing positioning to the UE through collection of various pieces of information, the UE may perform more accurate positioning measurement.

Location information transmission may be performed through the LPP. The location server may make a request for location information to the UE, and the UE may provide the measured location information to the location server according to the corresponding request. In the case of the UE-assisted method, the corresponding location information may be a measurement value for the positioning scheme based on the received positioning signal. Unlike this, in the case of the UE-based method, the corresponding location information may be two-dimensional (x, y) and three-dimensional (x, y, z) coordinate location values of the UE. When requesting location information to the UE, the location server may include required accuracy and a response time as positioning quality of service (QoS) information. When the request for the corresponding positioning QoS information is made, the UE needs to provide location information measured to satisfy the corresponding accuracy and response time to the location server, and when it is not possible to satisfy the QoS, error processing and abort may be considered. However, this is only an example, and error processing and abort for positioning may be performed in cases other than when it is not possible to satisfy the QoS.

The positioning protocol defined between the BS and the location server may be referred to as the LPPa in the LTE system, and functions including transmission of E-CID location information, transmission of OTDOA information, reporting of a general error state, and/or transmission of assistance information may be performed between the BS and the location server.

The positioning protocol defined between the BS and the location server may be referred to as the NRPPa in the NR system, and not only the roles played by the LPPa but also functions including transmission of positioning information, transmission of measurement information, and/or transmission of TRP information may be performed between the BS and the location server.

The NR system may support more positioning schemes than the LTE system. Accordingly, various positioning schemes may be supported through transmission of the positioning information. For example, the BS can perform positioning measurement through a positioning sound reference signal (SRS) transmitted by the UE. Accordingly, as the positioning information, information related to the SRS configuration and activation/deactivation may be exchanged between the BS and the location server.

Transmission of the measurement information indicates a function of exchanging information related to multi-RTT, UL-TDOA, and UL-AOA which are not supported by the LTE system between the BS and the location server.

Transmission of the TRP information may be a function of exchanging information related to performance of positioning based on the TRP. Cell-based positioning is performed in the LTE system, but TRP-based positioning is performed in the NR system and thus transmission of the TRP information may be supported.

An entity which performs a positioning-related configuration and an entity which calculates positioning to measure the location of the UE in the SL may be divided into a UE (no LS), an LS (through the BS), and/or an LS (through the UE).

As described above, the UE performing transmission and reception through the SL may be a vehicle UE or a pedestrian UE. The UE performing transmission and reception through the SL may include RSU having UE functions, an RSU having BS functions, or an RSU having some of the BS functions and some of the UE functions. The UE performing transmission and reception through the SL may include a positioning reference unit (RRU) knowing the location of the UE. The UE (no LS) refers to an SL UE having no connection with the location server. The LS (through BS) is the location server having the connection with the BS. Unlike this, the LS (through UE) is the location server having the connection with the SL UE. In other words, the LS (through UE) indicates when the location server is available even when the UE is not within the BS coverage. The LS (through UE) may be available for a specific UE, such as the RSU or the PRU, rather than the general UE. The UE connected with the location server in the SL may be defined as a new UE (new type of device). Only a specific UE connected with the location server and supporting a UE capability may perform a function of making the connection with the location server through the SL.

In Table 1 below, case 1 to case 9 indicate various combinations according to an entity which performs a positioning-related configuration and an entity which calculates positioning to measure the location of the UE in the SL.

Herein, a UE which requires measurement of the location of the UE is referred to as a target UE. A UE of which the location is known or a UE which may provide a positioning signal to measure the location of the target UE is referred to as a positioning reference (PosRef) UE. Accordingly, the PosRef UE may have its own location information and may provide an S-PRS and location information of the UE together. In other words, the PosRef UE may be a UE already knowing the location (known location UE). The terms of the target UE and the PosRef UE may be replaced with other terms. For example, the PosRef UE may be referred to as an anchor UE.

The positioning configuration may be divided into a UE-configured scheme and a network-configured scheme.

In Table 1, when the positioning configuration is the UE (no LS) may correspond to the UE-configured scheme. The UE-configured scheme has an advantage in that the positioning configuration is possible even when the UE is not within the network (BS) coverage.

In Table 1, when the positioning configuration is the LS (through BS) may correspond to the network-configured scheme. The case of the network-configured scheme is when the UE is within the network coverage in which case positioning calculation and measurement information is reported to the BS and the location server connected to the BS performs measurement of the location of the target UE, and thus a more accurate location measurement may be possible even through delay due to signaling related to the location measurement may occur.

In Table 1, when the positioning configuration is the LS (through UE) does not correspond to a scheme in which the UE is configured through the BS within the network coverage and thus may not classified as the network-configured scheme. When the location server connected to the UE provides the configuration but the UE does make the configuration may not be classified as the UE-configured scheme. However, when the UE performs the configuration may be classified as the UE-configured scheme. Accordingly, the case of the LS (through UE) may be referred to as another scheme instead of the UE-configured scheme or the network-configured scheme.

The positioning calculation may be divided into two schemes such as a UE-assisted scheme and a UE-based scheme. In Table 1, when the positioning calculation is the UE (no LS) may correspond to the UE-based scheme and when the positioning calculation is the LS (through BS) or the LS (through UE) may generally correspond to the UE-assisted scheme. However, when the positioning calculation is the LS (through UE) and the corresponding location server is analyzed as the UE, the LS (through UE) may be classified as the UE-based scheme.

TABLE 1

| | Positioning configuration | Positioning calculation |
|---|---|---|
| Case 1 | UE (no LS) | UE (no LS) |
| Case 2 | UE (no LS) | LS (through BS) |
| Case 3 | UE (no LS) | LS (through UE) |
| Case 4 | LS (through BS) | UE (no LS) |
| Case 5 | LS (through BS) | LS (through BS) |
| Case 6 | LS (through BS) | LS (through UE) |
| Case 7 | LS (through UE) | UE (no LS) |
| Case 8 | LS (through UE) | LS (through BS) |
| Case 9 | LS (through UE) | LS (through UE) |

In Table 1 above, the positioning configuration information may include an S-PRS configuration information. The S-PRS configuration information may be pattern information of the S-PRS and information related to the time/frequency transmission location. In Table 1, for the positioning calculation, the UE may receive the S-PRS and perform measurement, based on the received S-PRS, and the positioning measurement and calculation may vary depending on which positioning method is applied. Measurement of location information in the SL may be absolute positioning of providing two dimensional (x, y) and three-dimensional (x, y, z) coordinate location values of the UE and may be relative positioning of providing relative two-dimensional or three-dimensional location information from another UE. Location information in the SL may be merely ranging information including one of the distance or the direction from another UE. When the meaning of ranging includes both the distance information and the direction information in the SL, ranging may be the same as the relative positioning. As the positioning method, methods, such as SL time difference of arrival (SL-TDOA), SL angle-of-departure (SL-AOD), SL multi-RTT, SL RTT, or SL E-CID, or SL angle-of-arrival (SL E-CID), may be considered.

In FIGS. 4 to 6, signaling of positioning configuration information is shown as thin solid lines. Transmission of the S-PRS is shown as dotted lines. It is noted that transmission of the S-PRS may be performed bi-directionally or uni-directionally. Transmission of information measured for positioning or measured positioning information is shown as thick solid lines. Transmission of location information known to the UE (known location) is shown as alternate long and short dashed lines.

Figure 4A:
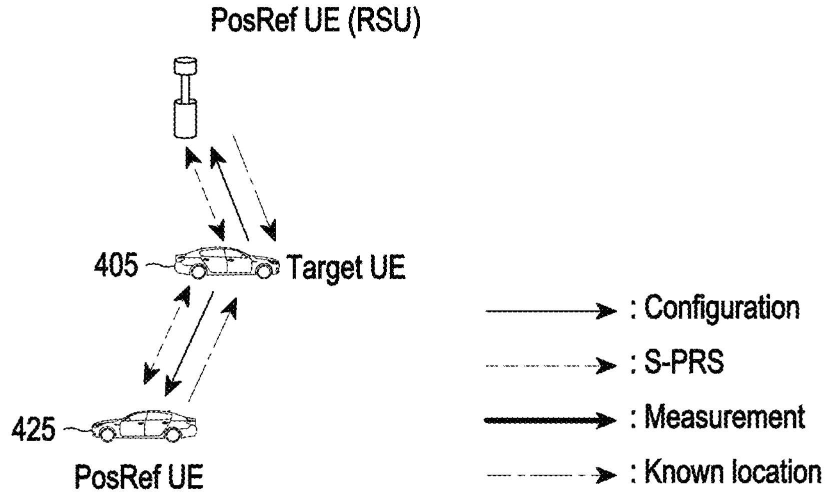
FIG. 4A illustrates when an SL UE having no connection with a location server provides a positioning configuration and a target UE having no connection with the location server performs positioning calculation according to an embodiment.

FIG. 4A illustrates when the SL UE having no connection with the location server provides the positioning configuration and the target UE 405 having no connection with the location server performs positioning calculation according to an embodiment.

FIG. 4A may correspond to case 1 in Table 1. In such a case, the target UE 405 may broadcast, unicast, or groupcast an indication for positioning-related configuration information to another UE (PosRef UE) 425 through the SL. The target UE may perform positioning calculation, based on a provided positioning signal.

Figure 4B:
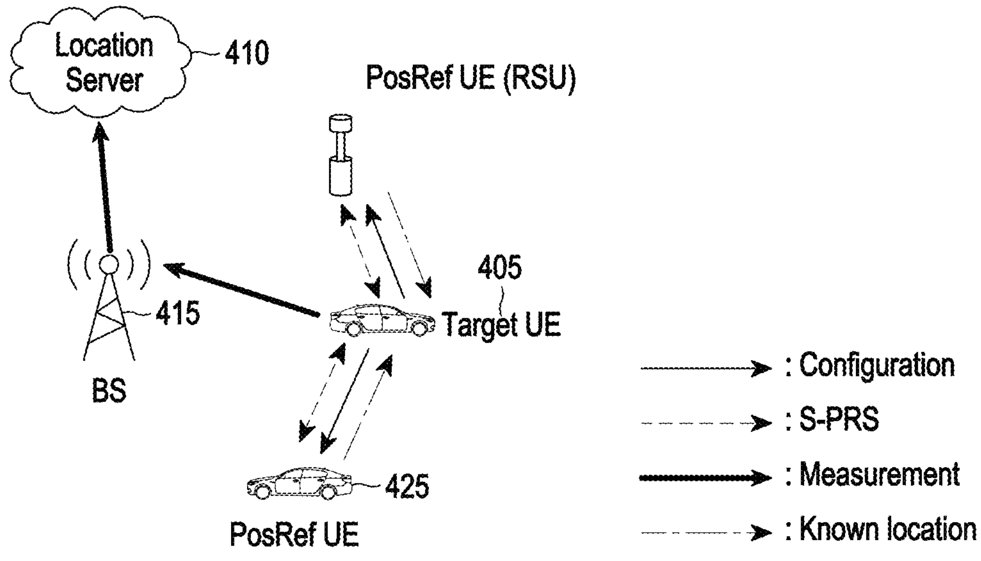
FIG. 4B illustrates when the SL UE having no connection with the location server provides the positioning configuration and the target UE is located within the network coverage and thus the location server connected to a BS performs positioning calculation according to an embodiment.

FIG. 4B illustrates when the SL UE having no connection with the location server provides the positioning configuration and the target UE 405 is located within the network coverage and thus the location server connected to the BS performs positioning calculation according to an embodiment.

FIG. 4B may correspond to case 2 in Table 1. In such a case, the target UE 405 may broadcast, unicast, or groupcast an indication for positioning-related configuration information to another UE 425 through the SL. The target UE 405 may perform positioning measurement, based on a provided positioning signal and report measured positioning information to the BS 415 since the target UE 405 is within the BS 415 coverage. Accordingly, the corresponding measurement information may be reported to the location server 410 connected to the BS 415 and the location server 410 may perform positioning calculation.

Figure 4C:
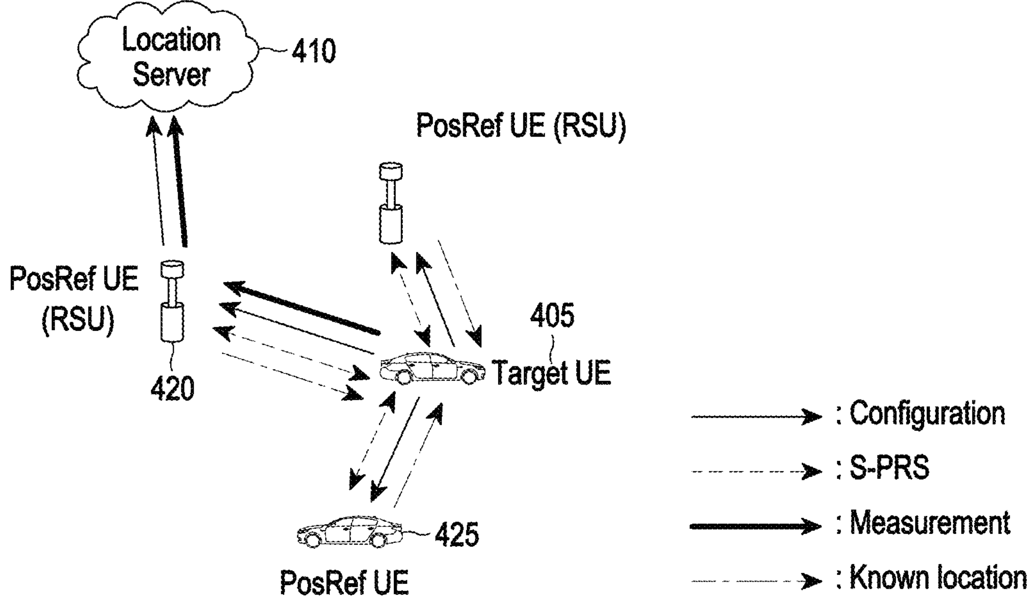
FIG. 4C illustrates when the SL UE having no connection with the location server provides the positioning configuration and the location server connected through the SL UE performs positioning calculation according to an embodiment.

FIG. 4C illustrates an example in which the SL UE having no connection with the location server 410 provides the positioning configuration and the location server 410 connected through the SL UE performs positioning calculation.

FIG. 4C may correspond to case 3 in Table 1. In such a case, the target UE 405 may broadcast, unicast, or groupcast an indication for positioning-related configuration information to another UE 425 through the SL. The target UE 405 may perform positioning measurement, based on a provided positioning signal and report measured positioning information to the UE connected to the location server 410 since the target UE 405 is within the coverage of the SL with the UE connected to the location server 410. Although FIG. 4C illustrates that the UE connected to the location server 410 is a PosRef UE (RSU) 420, it is noted that the UE may be a UE other than the RSU 420. The corresponding measurement information may be reported to the location server 410 connected to the PosRef UE (RSU) 420 and the location server 410 may calculate positioning calculation.

Figure 5A:
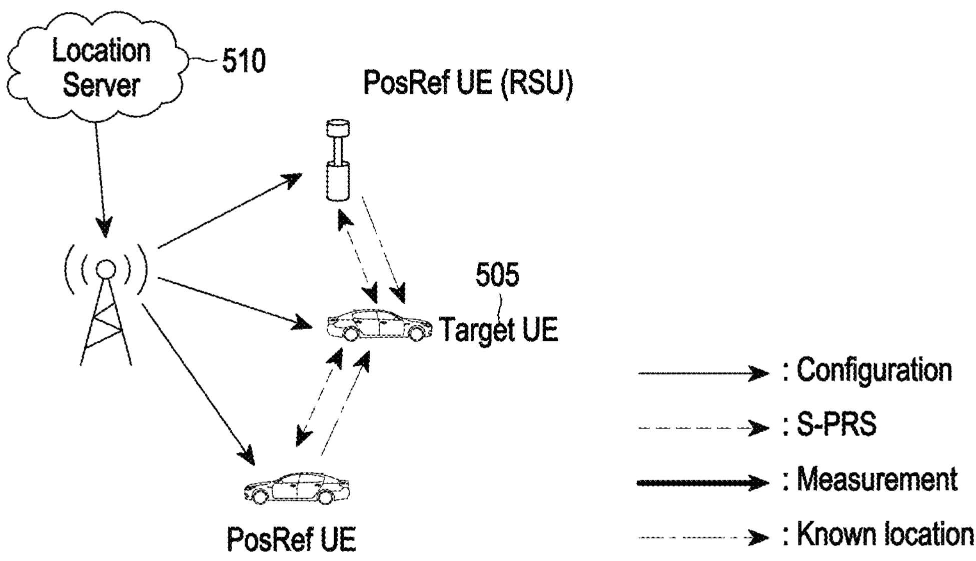
FIG. 5A illustrates when the SL UE is located within the network coverage, the location server connected to the BS provides the positioning configuration, and the target UE having no connection with the location server performs positioning calculation according to an embodiment.

FIG. 5A illustrates when the SL UE is located within the network coverage and thus the location server connected to the BS provides the positioning configuration, and the target UE having no connection with the location server performs positioning calculation according to an embodiment.

FIG. 5A may correspond to case 4 in Table 1. In such a case, the location server 510 connected to the BS may provide positioning configuration information by using a positioning protocol such as the LPP. The target UE 505 may perform positioning calculation, based on provided configuration information and positioning signal.

Figure 5B:
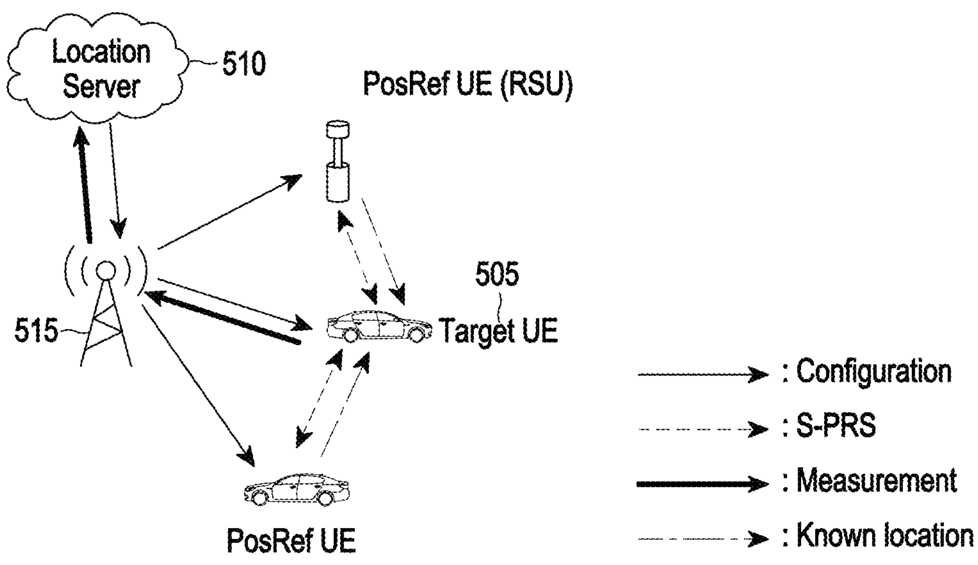
FIG. 5B illustrates when the SL UE is located within the network coverage and thus the location server connected to the BS provides the positioning configuration and the target UE is located within the network coverage and thus the location server connected to the BS performs positioning calculation according to an embodiment.

FIG. 5B illustrates when the SL UE is located within the network coverage and thus the location server 510 connected to the BS 515 provides the positioning configuration, and the target UE 505 is located within the network coverage and thus the location server 510 connected to the BS 515 performs positioning calculation according to an embodiment.

This may correspond to case 5 in Table 1. In such a case, the location server 510 connected to the BS 515 may provide positioning configuration information by using a positioning protocol such as the LPP. The target UE 505 may perform positioning measurement, based on provided configuration information and positioning signal and report measured positioning information to the BS 515 since the target UE 505 is within the BS 515 coverage. Accordingly, the corresponding measurement information may be reported to the location server 510 connected to the BS 515 and the location server 510 may perform positioning calculation.

Figure 5C:
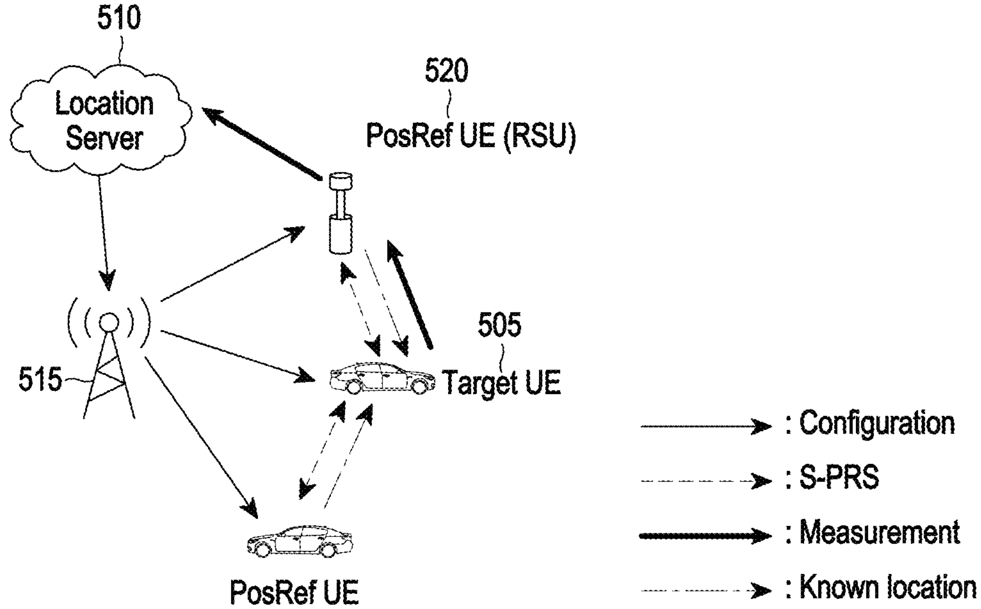
FIG. 5C illustrates when the SL UE is located within the network coverage and thus the location server connected to the BS provides the positioning configuration, and the location server connected through the SL UE performs positioning calculation according to an embodiment.

FIG. 5C illustrates when the SL UE is located within the network coverage and thus the location server 510 connected to the BS 515 provides the positioning configuration and the location server 510 connected through the SL UE performs positioning calculation according to an embodiment.

FIG. 5C may correspond to case 6 in Table 1. In such a case, the location server 510 connected to the BS 515 may provide positioning configuration information by using a positioning protocol such as the LPP. The target UE 505 may perform positioning measurement, based on provided configuration information and positioning signal and report measured positioning information to the UE connected to the location server 510 since the target UE 505 is within the coverage of the SL with the UE connected to the location server 510. Although FIG. 5C illustrates that the UE connected to the location server 510 is a PosRef UE (RSU) 520, it is noted that the UE may be a UE other than the PosRef UE (RSU) 520. The corresponding measurement information may be reported to the location server 510 connected to the PosRef UE (RSU) 520 and the location server 510 may calculate positioning calculation.

Figure 6A:
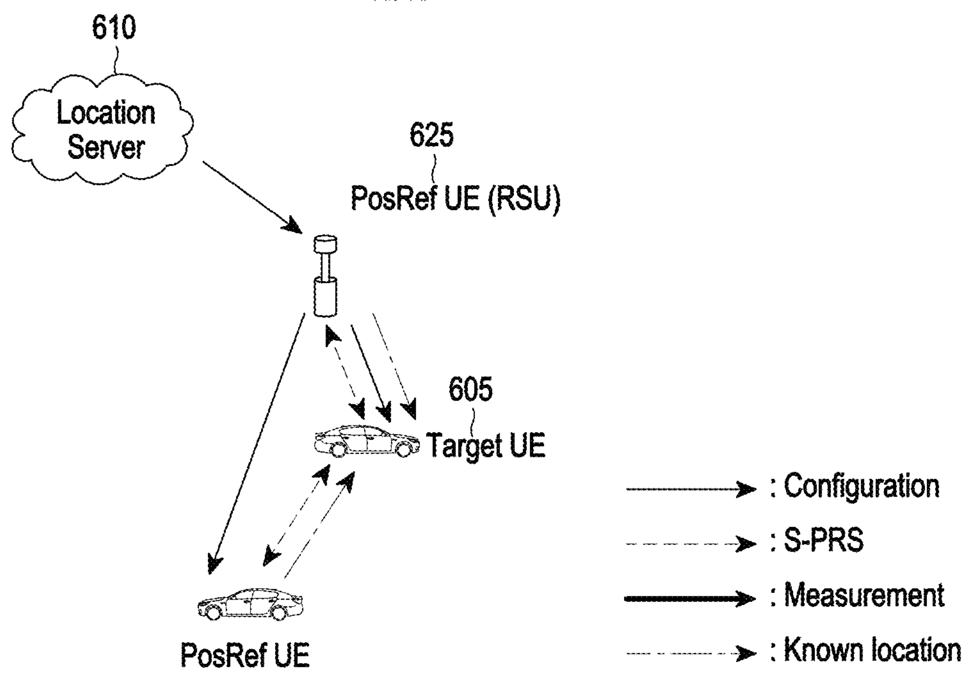
FIG. 6A illustrates when the location server connected through the SL UE provides the positioning configuration and the target UE having no connection with the location server performs positioning calculation according to an embodiment.

FIG. 6A illustrates when the location server 610 connected through the SL UE provides the positioning configuration and the target UE 605 having no connection with the location server 610 performs positioning calculation according to an embodiment.

FIG. 6A may correspond to case 7 in Table 1. In such a case, the location server 610 connected to another UE 625 may provide positioning configuration information by using a positioning protocol such as the LPP. The target UE 605 may perform positioning calculation, based on provided configuration information and positioning signal.

Figure 6B:
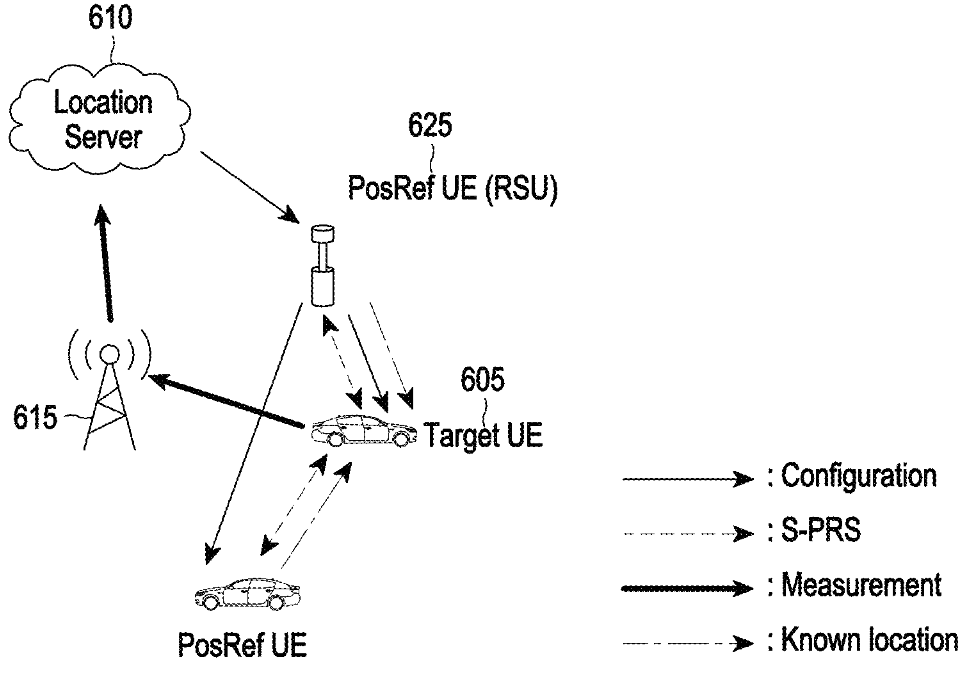
FIG. 6B illustrates when the location server connected through the SL UE provides the positioning configuration, and the target UE is located within the network coverage and thus the location server connected to the BS performs positioning calculation according to an embodiment.

FIG. 6B illustrates when the location server 610 connected through the SL UE provides the positioning configuration and the target UE 605 is located within the network coverage and thus the location server 610 connected to the BS 615 performs positioning calculation.

FIG. 6B may correspond to case 8 in Table 1. In such a case, the location server 610 connected to another UE 625 may provide positioning configuration information by using a positioning protocol such as the LPP. The target UE 605 may perform positioning measurement, based on provided configuration information and positioning signal and report measured positioning information to the BS 615 since the target UE 605 is within the BS 615 coverage. Accordingly, the corresponding measurement information may be reported to the location server 610 connected to the BS 615 and the location server 610 may perform positioning calculation.

Figure 6C:
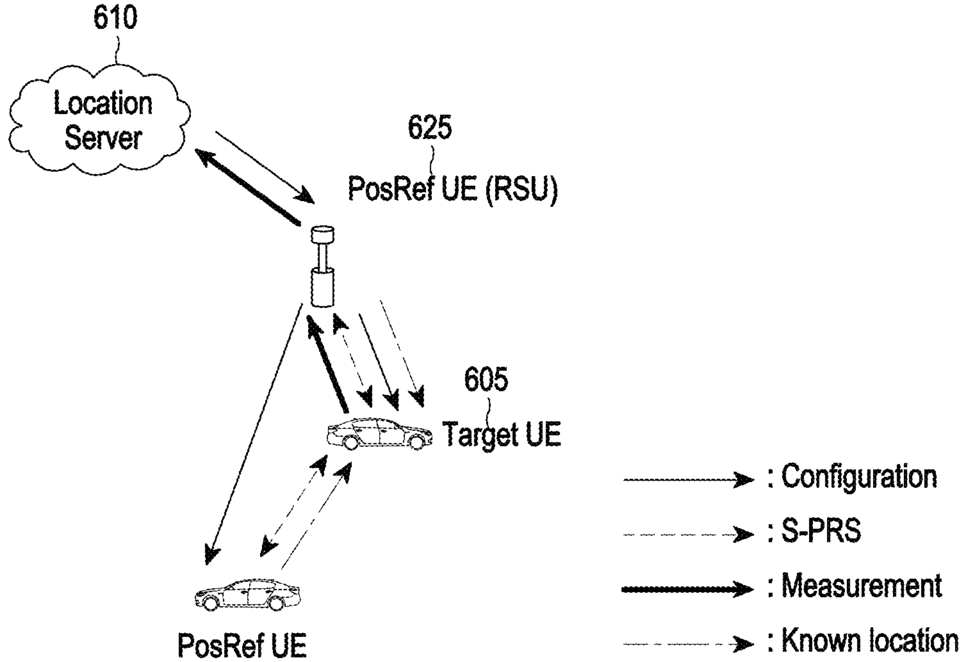
FIG. 6C illustrates when the location server connected through the SL UE provides the positioning configuration and the location server connected through the SL UE performs positioning calculation according to an embodiment.

FIG. 6C illustrates when the location server 610 connected through the SL UE provides the positioning configuration and the location server 610 connected through the SL UE performs positioning calculation.

FIG. 6C may correspond to case 9 in Table 1. In such a case, the location server 610 connected to another UE 625 may provide positioning configuration information by using a positioning protocol such as the LPP. The target UE 605 may perform positioning measurement, based on provided configuration information and positioning signal and report measured positioning information to another UE 625 connected to the location server 610 since the target UE 605 is within the coverage of the SL with another UE 625 connected to the location server 610. Although FIG. 6C illustrates that another UE 625 connected to the location server 610 is a PosRef UE (RSU) 620, it is noted that the UE may be a UE other than the RSU. The corresponding measurement information may be reported to the location server 610 connected to the PosRef UE (RSU) 620 and the location server 610 may perform positioning calculation.

Figure 7:
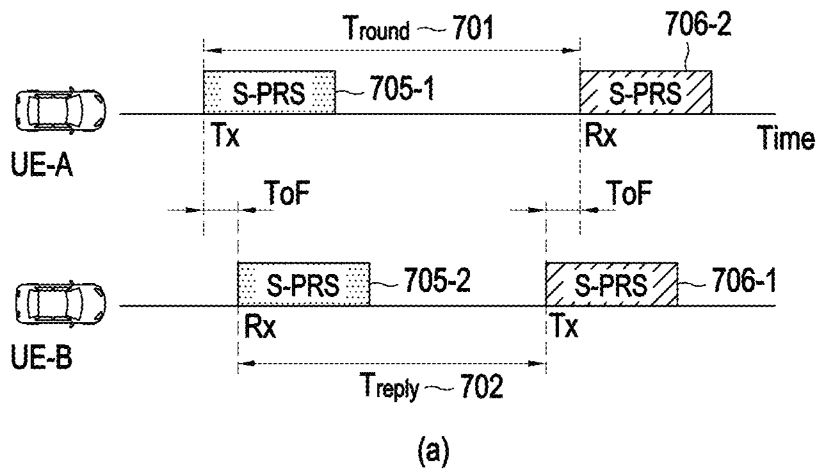
FIG. 7 illustrates when positioning is performed using an RTT scheme according to an embodiment.
Figure 7:
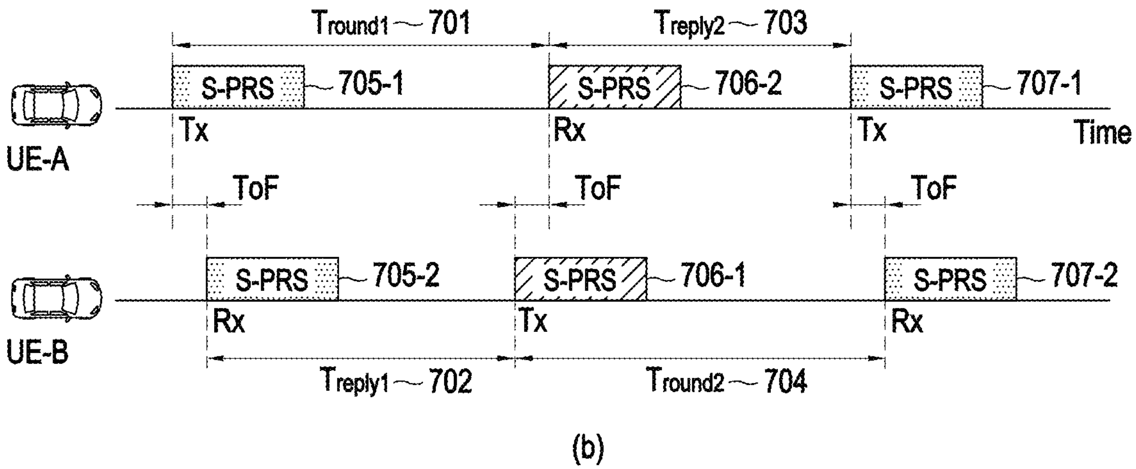

FIG. 7 illustrates the case of performing positioning through an RTT scheme according to an embodiment.

Referring to FIG. 7, a UE-A may correspond to a target UE and a UE-B may correspond to a PosRef UE. However, in FIG. 7, the UE-A and the UE-B are not limited to the target UE and the PosRef UE. In other words, the UE-A may correspond to the PoSRef UE and the UE-B may correspond to the target UE. FIG. 7 illustrates a method (single RTT) by which the target UE performs the RTT by one pair with one PosRef UE. However, the target UE may also perform the RTT with a plurality of PosPef UEs, in which case there is a plurality of pairs configured by the target UE with the PosRef UE, and such a scheme may be referred to as a multi-RTT. In order to perform absolute positioning, the target UE may need the multi-RTT. The ToF may be measured using the RTT scheme, and the distance and the coordinate location of the UE may be calculated using the equation of velocity=distance time, distance=velocity×time, or time=distance/velocity. The ToF refers to the time, and the velocity of light may be applied as the velocity.

A single-sided RTT method is first illustrated in section (a) of FIG. 7. According to the single-sided RTT, RTT measurement may be performed as the UE-A transmits a positioning signal 705-1 to the UE-B and the UE-B transmits a positioning signal 706-1 to the UE-A in response thereto. Specifically, the UE-A may calculate a time difference $T_{round}$ 701 between transmission of the positioning signal 705-1 to the UE-B and reception of the positioning signal 706-2 from the UE-B. The UE-B may calculate a time difference $T_{reply}$ 702 between reception of the positioning signal 705-2 from the UE-A and transmission of the positioning signal 706-1 to the UE-A. Based thereon, the ToF may be calculated as shown in Equation (1) below.

$$ToF = \frac{1}{2}(T_{round} - T_{reply}) \tag{1}$$

When UE-A calculates Equation (1) above, it is required to indicate $T_{reply}$ information calculated by UE-B to UE-A. However, when UE-B calculates Equation 1 above, it is required to indicate $T_{round}$ information calculated by UE-A to UE-B.

Referring to FIG. 7A, in the real world, the times measured by UE-A and UE-B, that is, $T_{round}$ 701 and $T_{reply}$ 702 in Equation (1) may vary depending on a clock source. Specifically, it may not be assumed that oscillators corresponding to clock sources of UE-A and UE-B are ideal. Further, it may not be assumed that they are the same oscillators. Specifically, in Table 2 below, the accuracy of the clock source is shown in units of part per million (ppm) according to the clock source, in other words, the type of the oscillator. As shown in Table 2, the accuracy of the clock source may have a large difference according to the type of the oscillator, and it may be observed that the price (that is, cost) of the oscillator increases as the accuracy of the oscillator increases. As shown in Table 2, the accuracy may decrease as the time elapses according to the type of the oscillator.

TABLE 2

| Type | Accuracy (ppm) | Aging/ 10 years (ppm) | Cost ($) |
|---|---|---|---|
| Relaxation Osc. | >1000 | — | <1 |
| External XO | 10-100 | 10-20 | ~1 |

TABLE 2-continued

| Type | Accuracy (ppm) | Aging/ 10 years (ppm) | Cost ($) |
|---|---|---|---|
| TCXO | 2-10 | 10-20 | ~5 |
| OCXO 15-100 MHz | 0.5 | ~0.01 | ~50 |
| MEMs OCXO | 0.008 | ~0.025 | ~160 |
| Rubidium Atomic | $10^{-6}$ | 0.005 | ~1000 |
| Cesium Beam | $10^{-7}$ | — | ~3000 |

XO: crystal oscillator;
TCXO: temperature-compensated crystal oscillator;
OCXO: Oven-Controlled Crystal Oscillators;
MEMS: microelectromechanical systems.

Accordingly, through the single-sided RTT method, Equation (2) below may be made in consideration of a clock source error during ToF measurement.

$$ToF_{estimated} = \frac{1}{2}(T_{round}(1 + e_A) - T_{reply}(e_B + 1)) \tag{2}$$

In Equation (2), $e_A$ and $e_B$ denote clock source errors of UE-A and UE-B expressed by ppm. Accordingly, the ToF measurement error considering the clock source error using Equation (1) and Equation (2) may be expressed by the following equation. In the case of $T_{reply}$>>ToF, it is known that it can be summarized as shown below in Equation (3). Since a detailed induction process of Equation (3) is omitted for conciseness.

$$ToF - ToF_{estimated} \approx \frac{1}{2}(e_A - e_B)T_{reply} \tag{3}$$

Equation (3) indicates that the ToF measurement error increases according to a value of $T_{reply}$ 702 and the difference between clock source errors of UE-A and UE-B when the single-sided RTT method is used. Specifically, based on Table 3 below, a value of the ToF measurement error (ToF–$ToF_{estimated}$) according to $T_{reply}$ 702 and the clock error ($e_A$–$e_B$) is calculated.

TABLE 3

| $T_{reply}$ | Clock error (ns) 2 ppm | 5 ppm | 10 ppm | 20 ppm | 40 ppm |
|---|---|---|---|---|---|
| 100 μs | 0.1 | 0.25 | 0.5 | 1 | 2 |
| 200 μs | 0.2 | 0.5 | 1 | 2 | 4 |
| 500 μs | 0.5 | 1.25 | 2.5 | 5 | 10 |
| 1 ms | 1 | 2.5 | 5 | 10 | 20 |
| 2 ms | 2 | 5 | 10 | 20 | 40 |
| 5 ms | 5 | 12.5 | 25 | 50 | 100 |

According to Table 3, when $T_{reply}$ is 5 ms and the clock error ($e_A$–$e_B$) is 40 ppm, the ToF measurement error of 100 ns is generated, which corresponds to the ToF measurement error of 30 m (: velocity of light of about 300,000,000 m/s*100*$10^{-9}$ sec). When $T_{reply}$ is 50 ms and the clock error ($e_A$–$e_B$) is 40 ppm, the ToF measurement error of 1000 ns is generated. 1000 ms may correspond to the ToF measurement error of 300 m. When the ToF measurement error is generated, the accuracy of positioning may finally decreased.

An error according to delay that may be generated during the RTT process as well as an influence of the clock source error may be considered. The error according to the corresponding delay may be generated by the following elements but is not limited thereto.

Propagation delay, which may be generated when a transmitted signal is received via various obstacles.

Transmission time delay, which may be generated by various internal/external factors of the transmission UE, such as by message transmission between layers and an antenna.

Reception time delay, which may be generated by various internal/external factors of the reception UE, such as by message transmission between layers and an antenna.

When the error according to the delay is considered with the clock source error, the ToF measurement error in Equation (3) may be replaced with Equation (4) as follows.

$$ToF_{estimated} \approx \frac{1}{2}(e_A - e_B)T_{reply} + \frac{1}{2}\alpha_{ABA}T_{reply} \tag{4}$$

In Equation (4), $\alpha_{ABA}$ is expressed by ppm and denotes an error according to delay generated during an RTT process of UE-A→UE-B→UE-A. This indicates that the ToF measurement error may be increased by the large error according to the delay as well as the value of $T_{reply}$ 702 and the clock source errors of UE-A and UE-B.

Section (b) in FIG. 7 illustrates a double-sided RTT method.

According to the double-sided RTT, as shown in section (b) in FIG. 7, RTT measurement may be performed as UE-A transmits the positioning signal 705-1 to UE-B, UE-B transmits the positioning signal 706-1 to UE-A in response thereto, and UE-A transmits again the positioning signal 707-1 to UE-B. Specifically, UE-A may calculate the time difference $T_{round1}$ 701 between transmission of the positioning signal 705-1 to UE-B and reception of the positioning signal 706-2 from UE-B. UE-B may calculate the time difference $T_{reply}$ 702 between reception of the positioning signal 705-2 from UE-A and transmission of the positioning signal 706-1 to UE-A. Subsequently, UE-A may calculate a time difference $T_{reply2}$ 703 between reception of the positioning signal 706-2 from UE-B and transmission of the second positioning signal 707-1 to UE-B. UE-B may calculate a time difference $T_{round2}$ 704 between transmission of the positioning signal 706-1 to UE-B and reception of the positioning signal 707-2 from UE-A. An equation of calculating the ToF, based on $T_{round1}$, $T_{round2}$, $T_{reply1}$, and $T_{reply2}$ is known as shown below in Equation (5).

$$ToF = \frac{1}{2}(T_{round1} \times T_{round2} - T_{reply} \times T_{reply2})/(T_{round1} + T_{round2} + T_{reply1} + T_{reply2}) \tag{5}$$

When UE-A calculates ToF in Equation (5), it is required to indicate $T_{reply1}$ 702 $T_{round2}$ 704 information calculated by UE-B to UE-A. However, when UE-B calculates ToF in Equation (5), it is required to indicate $T_{round1}$ 701 and $T_{reply2}$ 703 information calculated by UE-A to UE-B. Compared to the single-sided RTT, the double-sided RTT may have additional delay to calculate the ToF. In the disclosure, the RTT method is not limited to the two methods.

Compared to the single-sided RTT, the double-sided RTT according to Equation (5) may minimize the influence of the clock source error by each UE, thereby improving the accuracy of positioning. When the ToF is measured through the double-sided RTT method, it is known that the ToF measurement error considering the clock source error is determined as shown below in Equation (6).

$$ToF - ToF_{estimated} \approx \frac{1}{4}(e_A - e_B)(T_{reply1} - T_{reply2}) \quad (6)$$

In Equation (6), to minimize the ToF measurement error, it is required to make the values of $T_{reply1}$ 702 and $T_{reply2}$ 703 almost identical, which is related to selection of resources of the S-PRS in the SL.

An error according to delay that may be generated during the RTT process as well as an influence of the clock source error may be considered. When the clock source error ($e_A$, $e_B$) and the error ($\alpha_{BAB}$, $\alpha_{ABA}$) according to the delay are considered together, it is known that the ToF measurement error of Equation (3) can be summarized as shown in below in Equation (7).

$$ToF - ToF_{estimated} \approx \frac{1}{4}(e_A - e_B)(T_{reply1} - T_{reply2}) + \frac{1}{4}(\alpha_{BAB}T_{reply1} + \alpha_{ABA}T_{reply2}) \quad (7)$$

In Equation (7), $\alpha_{ABA}$ is expressed by ppm and denotes an error according to delay generated during an RTT process of UE-A→UE-B→UE-A. $\alpha_{BAB}$ is expressed by ppm and denotes an error according to delay generated during an RTT process of UE-B→UE-A→UE-B. This indicates that the ToF measurement error can be increased by the error according to delay and values of $T_{reply1}$ 702 and $T_{reply2}$ 703 when the error according to delay is large as well as the difference between values of $T_{reply1}$ 702 and $T_{reply2}$ 703 and the difference ($e_A - e_B$) between clock source errors of UE-A and UE-B.

When the double-sided RTT presented in section (b) of FIG. 7 is used, compared to the single-sided RTT scheme presented in section (a) of FIG. 7, it is known that the ToF measurement error is not influenced by the value of $T_{reply}$ in Equation (8) below unlike in Equation (3).

$$ToF - ToF_{estimated} \approx ToF\left(1 - \frac{k_A + k_B}{2}\right) \quad (8)$$

In Equation (8), $k_A$ and $k_B$ denote ratios of frequencies in which clocks of UE-A and UE-B operate compared to the ideal clock frequency (example of the value: 0.99998 or 1.00002). In Equation (8), the clocks of UE-A and UE-B operate at $k_A$ and $k_B$ times the ideal clock frequency, respectively. For example, actual $T_{reply}$ that assumes the ideal clock for the measurement value $T_{reply}$ of UE-A may be expressed as $k_A T_{reply}$. Actual $T_{reply}$ that assumes the ideal clock for the measurement value $T_{reply}$ of UE-B may be expressed as $k_B T_{reply}$. in Equation (8), when the double-sided RTT presented in section (b) in FIG. 7 is used, the ToF error is not influenced by the value of $T_{reply}$ ($T_{reply1}$ or $T_{reply2}$) during the ToF measurement, compared to the single-sided RTT scheme presented in section (a) in FIG. 7. However, this may correspond to when the error according to delay is not considered or the corresponding error is small. When error influence according to delay is large, the ToF measurement error may be influenced by the value of $T_{reply}$ ($T_{reply1}$ or $T_{reply2}$) as illustrated in FIG. 7.

In the case of the value of $T_{reply}$ ($T_{reply1}$, $T_{reply2}$, or ($T_{reply1} - T_{reply2}$) in section (b) in FIG. 7) in SL positioning may be determined by the result of resource selection for S-PRS transmission. Resource selection for S-PRS transmission in SL positioning may be divided into a method of receiving allocation of resources for the corresponding resources from the BS (hereinafter, referred to as scheme 1) and a method of selecting resources by the UE through direct sensing (hereinafter, referred to as scheme 2). In the case of scheme 2, the UE operation should be defined, and scheme 2 may be performed according to the following procedure. However, the method of selecting resources for S-PRS transmission is not limited to the following procedure.

The UE performs sensing in a sensing window. Sensing by the UE may be defined as an operation of decoding SL control information (SCI) transmitted by another UE and performing reference signal received power (RSRP) measurement. SCI may include resource allocation information, and the UE may detect whether another UE occupies resources in a resource selection window corresponding to a candidate resource area which the UE desires to transmit through SCI decoding and, if occupied, determine how much influence is made through RSRP measurement. The RSRP may be RSRP measured through the S-PRS. The UE may select N candidate resources through the corresponding sensing.

The UE may randomly select resources for S-PRS transmission from the selected N candidate resources, based on the sensing result.

Through the following embodiment, a method capable of minimizing the ToF measurement error according to an RTT scheme applied to the sidelink is proposed. It is noted that, as the ToF measurement error is minimized, the sidelink positioning accuracy may be improved. Herein, the UE which can provide a positioning signal to measure the location of the target UE is referred to as an anchor UE. The anchor UE may be a UE which already knows the location (known location UE) or a UE which does not know the location (unknown location UE). When the anchor UE is the UE which already knows the location (known location UE), the corresponding location information may be transferred to the target UE and thus the target UE may perform UE-based positioning. Disclosed herein are RTT-based methods, but it is noted that the proposed methods can be applied to other positioning methods as well as the RTT.

Indications of values corresponding to the value of $T_{reply}$ and the value of $T_{round}$ may be values within a range of $-985024{*}T_c$ to $985024{*}T_c$ (about 1 msec). $T_c = 1/(\Delta f_{max} \cdot N_f)$, $\Delta f_{max}$=480-103 Hz, and $N_f$=4096. The resolution may be $X \cdot T_c \cdot X$ may be an integer value such as X=1, 2, . . . and is not limited to a specific value in the disclosure. In the RTT operation, the actual values of $T_{reply}$ and $T_{round}$ may be values larger than the indication range (about 1 msec). However, the disclosure assumes a system in which UEs are well synchronized, and, for example, it is assumed that UE-B receives the S-PRS 705-2 at 0 ns of slot #0 in section (a) in FIG. 7, and that the S-PRS 706-1 is transmitted at 3 ns of slot #5. The actually indicated value may be a value corresponding to 3 ns in the range of $-985024{*}T_c$ to $985024{*}T_c$ (about 1 msec). However, a value corresponding to actual $T_{reply}$ 702 may be a value corresponding to 5 slot+3 ns. The length of the slot varies depending on numerology according to subcarrier spacing (SCS). For example, in the case of a subcarrier of 15 kHz, the length may be a value corresponding to 1 slot=1 ms.

First Embodiment

The first embodiment presents a method of solving an error that can be generated when the ToF is measured through the single-sided RTT method in the SL.

Specifically, the first embodiment presents a method of solving an error that may be generated by ToF measurement when the RTT method presented in section (a) in FIG. 7 is applied. According to Equation 3 and Equation 4 above, it is observed that, when a clock error and an error according to delay are considered for ToF measurement, the ToF error may increase according to the value of $T_{reply}$. In other words, as the value of $T_{reply}$ becomes higher, the ToF error may increase. The value of $T_{reply}$ in SL positioning may be determined by the result of resource selection for S-PRS transmission. Accordingly, when the RTT method presented in section (a) in FIG. 7 is applied, it is required to determine a resource selection method suitable therefor.

Referring to section (a) in FIG. 7, an entity which performs SL positioning when the single-sided RTT is performed may be UE-A. The entity which performs positioning may measure the ToF and acquire a position of the UE (distance and coordinate information). UE-A may make a request for performing the RTT to a neighbor UE to directly perform positioning. UE-A may be triggered by another UE, the BS, or the location server to perform positioning.

The request for performing the RTT (i.e., an RTT perform request) may be a request from the neighbor UE for transmitting the S-PRS and providing the value of $T_{reply}$. The value of $T_{reply}$ may be referred to as Rx-Tx difference measurement. 1-bit information may be needed to make the request for performing the RTT, and SCI, PC5-RRC, SL MAC-CE, or higher-layer (for example, RRC layer) indication methods from the location server through a positioning protocol may be considered for the corresponding information. In the disclosure, the corresponding indication method is not limited to a specific method.

Referring to section (a) in FIG. 7, resources of the S-PRS 705-1 which UE-A transmits to UE-B and resources of the S-PRS 706-1 which UE-B transmits to UE-A should be selected and allocated to perform the single-sided RTT. Although only one UE-B is illustrated in section (a) in FIG. 7 for convenience of description, the number of UEs-B may be plural. When a plurality of UEs-B are considered, a plurality of transmission resources of the S-PRS 706-1 transmitted by the plurality of UEs-B may be selected to not collide with each other. Selection of the transmission resources of the S-PRSs 705-1 and 706-1 may determine values of $T_{round}$ 701 and $T_{reply}$ 702. For example, the value of $T_{reply}$ 702 may become smaller when UE-B receives the S-PRS 705-2 and transmits the S-PRS 706-1 within a short time interval. Further, selection of the transmission resources of the S-PRSs 705-1 and 706-1 should be performed to not collide with resources selected by another UE. The disclosure proposes methods of achieving the purpose of reducing the ToF measurement error. It is noted that the methods are limited to the following methods in the disclosure. Further, one or more of the following methods may be supported or a combination thereof may be used. When one or more of the following methods are supported, the used methods may be (pre-)configured or the selected methods may be indicated.

Method 1-1

Method 1-1 defines a threshold value ($T_{reply\_Th}$) for $T_{reply}$ 702. When S-PRS resources are selected through scheme 1 and scheme 2, resources for transmission of the S-PRS 706-1 should be selected to satisfy $T_{reply}$ 702$\leq T_{reply\_Th}$. The corresponding threshold value ($T_{reply\_Th}$) may be a value fixed to a specific value, a (pre-)configured value, or a value indicated through signaling. For signaling, RRC (PC5-RRC or Uu-RRC), a MAC-CE (SL MAC CE or Uu MAC CE), SCI, DL control information (DCI), or higher-layer indication methods from the location server through a positioning protocol may be considered. In the disclosure, the corresponding indication method is not limited to a specific method.

Method 1-2

In method 1-2, scheme 1 is considered for selection and allocation of S-PRS transmission resources of UE-A. UE-A will receive allocation of resources for transmission of the S-PRS 705-1 from the BS to measure the ToF using the RTT. When the BS selects transmission resources of the S-PRS 705-1, method 1-1 may be considered. The selected S-PRS transmission resources may be allocated to the UE. In order to allocate the S-PRS transmission resources to the UE, the BS may consider DCI, Uu-RRC, or a higher-layer indication method from the location server through the positioning protocol. In the disclosure, the corresponding indication method is not limited to a specific method. When transmitting the S-PRS, the UE may indicate information on the S-PRS transmission resources allocated by the BS to another neighbor UE. As the corresponding indication method, SCI may be considered. When information on S-PRS transmission resources selected and reserved by the UE is indicated through the SCI, the neighbor UE may decode the SCI through sensing to detect resource information selected and reserved by another UE and perform the operation of scheme 2 through RSRP measurement.

When UE-A receives allocation of transmission resources of the S-PRS 705 from the BS through scheme 1, UE-A may unicast, groupcast, or broadcast the S-PRS 705-1 to the neighbor UE. Subsequently, when the neighbor UE (UE-B) receives a request for performing the RTT, selection of resources for transmitting the S-PRS 706-1 and providing the value of $T_{reply}$ 702 by UE-B may be performed through various methods. As described above, the number of UEs-B may be one or plural. When a plurality of UEs-B is considered, a plurality of transmission resources of the S-PRS 706-1 transmitted by the plurality of UEs-B may be selected to not collide with each other. One or more of the following methods may be supported or a combination thereof may be used. When one or more of the following methods are supported, the used methods may be (pre-)configured or the selected methods may be indicated.

The following methods are detailed examples of selection or allocation of transmission resources of UE-B.

Through method 1-2-1, UE-B may receive allocation of resources for transmission of the S-PRS 706-1 from the BS through scheme1 and respond to an RTT request in a unicast, groupcast, or broadcast manner. In such a case, UE-B may expect allocation of resources for transmission of the S-PRS 706-1 from the BS through method 1-1. However, when the allocated transmission resources of the S-PRS 706-1 do not satisfy $T_{reply} T_{reply\_Th}$, the UE (UE-B) may make a request for reselecting/reallocating resources to the BS and the location server. For the corresponding request, a PUCCH, a PUSCH, Uu-RRC, a Uu MAC-CE, or higher-layer indication methods through a positioning protocol may be considered. Herein, the corresponding indication method is not limited to a specific method. However, when the transmission resources of the S-PRS 706-1 do not satisfy $T_{reply} \leq T_{reply\_Th}$, UE-B may not transmit a response to the RTT request to UE-A, which may be interpreted as an operation of not transmitting the S-PRS and not providing the value of $T_{reply}$ to UE-A.

Through method 1-2-2, UE-B may directly select and allocate transmission resources of the S-PRS 706-1 through scheme 2 and respond to an RTT request in a unicast, groupcast, or broadcast manner. The UE (UE-B) may select transmission resources of the S-PRS 706-1 in consideration of method 1-1. A detailed operation thereof is described below with reference to a sixth embodiment.

Through method 1-2-3, UE-B may receive allocation of the transmission resources of the S-PRS 706-1 from UE-A and respond to the RTT request in a unicast manner. The UE (UE-A) may select transmission resources of the S-PRS 706-1 in consideration of method 1-1. A detailed operation thereof is described below with reference to a seventh embodiment.

Through method 1-2-4, UE-B may receive allocation of the transmission resources of the S-PRS 706-1 from UE-A and respond to the RTT request in a unicast manner. The UE (UE-A) may transfer the transmission resources of the S-PRS 706-1 allocated by the BS through scheme1 to UE-B. The BS may select transmission resources of the S-PRS 706-1 in consideration of method 1-1. When UE-A transfers the transmission resources allocated by the BS to UE-B, SCI, PC5-RRC, an SL MAC-CE, or higher-layer indication methods from the location server through a positioning protocol may be considered for the corresponding information. When the transmission resources of the S-PRS 706-1 do not satisfy $T_{reply} \leq T_{reply\_Th}$, the UE (UE-B) may not transmit a response to the RTT request to UE-A. This may be interpreted as an operation of not transmitting the S-PRS and not providing the value of $T_{reply}$ to UE-A.

Method 1-3

In method 1-3, scheme 2 is considered for selection and allocation of S-PRS transmission resources of UE-A. UE-A may directly select and allocate S-PRS transmission resources to measure the ToF using the RTT. The UE may select S-PRS transmission resources in consideration of method 1-1. Information on the S-PRS transmission resources selected and reserved by the UE may be indicated to another neighbor UE when the S-PRS is transmitted. As the corresponding indication method, SCI may be considered. When information on S-PRS transmission resources selected and reserved by the UE is indicated through the SCI, the neighbor UE may decode the SCI through sensing to detect resource information selected and reserved by another UE and perform the operation of scheme 2 through RSRP measurement.

UE-A determining the S-PRS transmission resources through scheme 2 may unicast, groupcast, or broadcast the S-PRS 705-1 to the neighbor UE. Subsequently, when the neighbor UE (UE-B) receives a request for performing the RTT, selection of resources for transmitting the S-PRS 706-1 and providing the value of $T_{reply}$ 702 by UE-B may be performed through various methods. As described above, the number of UEs-B may be one or plural. One or more of the following methods may be supported or a combination thereof may be used. The methods may be (pre-)configured or the selected methods may be indicated.

The following methods are detailed examples of selection or allocation of transmission resources of UE-B.

Through method 1-3-1, UE-B may receive allocation of resources for transmission of the S-PRS 706 from the BS through scheme1 and respond to an RTT request in a unicast, groupcast, or broadcast manner. In such a case, UE-B may expect allocation of resources for S-PRS transmission by the BS through method 1-1. However, when the allocated transmission resources of the S-PRS 706-1 do not satisfy $T_{reply}$ 702$\leq T_{reply\_Th}$, the UE (UE-B) may make a request for reselecting/reallocating resources to the BS and the location server. For the corresponding request, a PUCCH, a PUSCH, Uu-RRC, a Uu MAC-CE, or higher-layer indication methods through a positioning protocol may be considered. However, when the transmission resources of the S-PRS 706-1 do not satisfy $T_{reply}$ 702$\leq T_{reply\_Th}$, UE-B may not transmit a response to the RTT request to UE-A. This may be interpreted as an operation of not transmitting the S-PRS 706-1 and not providing the value of $T_{reply}$ to UE-A.

Through method 1-3-2, UE-B may directly select and allocate transmission resources of the S-PRS 706-1 through scheme 2 and respond to an RTT request in a unicast, groupcast, or broadcast manner. The UE may select transmission resources of the S-PRS 706-1 in consideration of method 1-1. A detailed operation thereof is described below with reference to the sixth embodiment.

Through method 1-3-3, UE-B may receive allocation of the transmission resources of the S-PRS 706-1 from UE-A and respond to the RTT request in a unicast manner. The UE (UE-A) may select transmission resources of the S-PRS 706-1 in consideration of method 1-1. A detailed operation thereof is described below with reference to the seventh embodiment.

Through method 1-3-4, UE-B may receive allocation of the transmission resources of the S-PRS 706-1 from UE-A and respond to the RTT request in a unicast manner. The UE (UE-A) may transfer the transmission resources of the S-PRS 706-1 allocated by the BS through scheme1 to UE-B. The BS may select transmission resources of the S-PRS 706-1 in consideration of method 1-1. When UE-A transfers the transmission resources allocated by the BS to UE-B, SCI, PC5-RRC, an SL MAC-CE, or higher-layer indication methods from the location server through a positioning protocol may be considered for the corresponding information. When the transmission resources of the S-PRS 706-1 do not satisfy $T_{reply} \leq T_{reply\_Th}$, UE-B may not transmit a response to the RTT request to UE-A. This may be interpreted as an operation in which the UE (UE-B) does not transmit the S-PRS and not provide the value of $T_{reply}$ to UE-A.

Second Embodiment

The second embodiment presents a method of solving an error that can be generated when the ToF is measured through the double-sided RTT method in the SL.

Specifically, the second embodiment presents a method of solving an error that can be generated by ToF measurement when the RTT method presented in section (b) in FIG. 7 is applied. According to Equation (6) and Equation (7) above, it is observed that, when a clock error and an error according to delay are considered for ToF measurement, the ToF error may increase according to the value of $(T_{reply1}-T_{reply2})$, $T_{reply1}$, or $T_{reply2}$. In other words, as the value of $(T_{reply1}-T_{reply2})$, $T_{reply1}$, or $T_{reply2}$ becomes higher, the ToF error may increase. The value of $(T_{reply1}-T_{reply2})$, $T_{reply1}$, or $T_{reply2}$ in SL positioning may be determined by the result of resource selection for S-PRS transmission. Accordingly, when the RTT method presented in section (b) in FIG. 7 is applied, it is required to determine a resource selection method suitable therefor.

Referring to section (b) in FIG. 7, an entity which performs SL positioning when the double-sided RTT is performed may be UE-B. The entity which performs positioning may measure the ToF and acquire a position of the UE (distance and coordinate information). UE-B may make a request for performing the RTT to a neighbor UE to directly perform positioning. UE-B may be triggered by another UE, the BS, or the location server to perform positioning.

However, the entity which performs SL positioning in section (b) in FIG. 7 may be UE-A. The entity which performs positioning may measure the ToF and acquire a position of the UE (distance and coordinate information). When UE-B is the entity which performs positioning, UE-B performs only one signal transmission to UE-A (for example, in transmission of the S-PRS 707-1). When UE-A is the entity which performs positioning, UE-B is required to perform two signal transmissions to UE-A (for example, in transmission of the S-RPS 706-1 and transmission of measured $T_{round2}$ 704). When UE-A is the entity, UE-A may make a request for performing the RTT to a neighbor UE to directly perform positioning. UE-A may be triggered by another UE, the BS, or the location server to perform positioning.

The request for performing the RTT may be a request for transmitting the S-PRS and providing $T_{reply}$ to the neighbor UE. The value of $T_{reply}$ may be referred to as Rx-Tx difference measurement. The value of $T_{round}$ may be referred to as Tx-Rx difference measurement. 1-bit information may be needed to make the request for performing the RTT, and SCI, PC5-RRC, an SL MAC-CE, or higher-layer indication methods from the location server through a positioning protocol may be considered for the corresponding information.

Referring to section (b) in FIG. 7, resources of the S-PRS 705-1 which UE-A transmits to UE-B, resources of the S-PRS 706-1 which UE-B transmits to UE-A, and resources of the S-PRS 707-1 which UE-A transmits to UE-B again in order to perform the single-sided RTT should be selected and allocated. Although section (b) in FIG. 7 illustrates only one UE-B for convenience of description, the number of UEs-B may be plural. When a plurality of UEs-B is considered, a plurality of transmission resources of the S-PRS 706-1 transmitted by the plurality of UEs-B may be selected to not collide with each other. Selection of transmission resources of the S-PRSs 705-1, 706-1, and 707-1 may determine values of $T_{round1}$ 701, $T_{reply1}$ 702, $T_{round2}$ 703, and $T_{reply2}$ 704. Selection of the transmission resources of the S-PRSs 705-1, 706-1, and 707-1 should be performed to not collide with resources selected by another UE.

Method 2-1

Method 2-1 defines a threshold value ($T_{reply\_Th}$) for $T_{reply}$. $T_{reply}$ may correspond to $T_{reply1}$ 702 and $T_{reply2}$ 704 in section (b) in FIG. 7. When S-PRS resources are selected through scheme1 and scheme 2, resources for transmission of the S-PRS 706-1 and the S-PRS 707-1 should be selected to satisfy $T_{reply} \leq T_{reply\_Th}$. The corresponding threshold value ($T_{reply\_Th}$) may be a value fixed to a specific value, a (pre-)configured value, or a value indicated through signaling. For signaling, RRC (PC5-RRC or Uu-RRC), a MAC-CE (SL MAC CE or Uu MAC CE), SCI, DL control information (DCI), or higher-layer indication methods from the location server through a positioning protocol may be considered.

Method 2-2

Method 2-2 defines a threshold value ($T_{differ\_Th}$) for ($T_{reply1}-T_{reply2}$). For $T_{reply1}$ 702 and $T_{reply2}$ 703, see section (b) in FIG. 7. When S-PRS resources are selected through scheme1 and scheme 2, resources for transmission of the S-PRS 706-1 and the S-PRS 707-1 should be selected to satisfy ($T_{reply1}-T_{reply2}$)$\leq T_{differ\_Th}$. The corresponding threshold value ($T_{differ\_Th}$) may be a value fixed to a specific value, a (pre-)configured value, or a value indicated through signaling. For signaling, RRC (PC5-RRC or Uu-RRC), a MAC-CE (SL MAC CE or Uu MAC CE), SCI, DCI, or higher-layer indication methods from the location server through a positioning protocol may be considered.

Method 2-3

In method 2-3, scheme1 is considered for selection and allocation of S-PRS transmission resources of UE-A. UE-A will receive allocation of resources for transmission of the S-PRS 705-1 and the S-PRS 707-1 from the BS to measure the ToF using the RTT. When the BS selects the transmission resources of the S-PRS 705-1 and the S-PRS 707-1, method 2-1 may be considered. The selected S-PRS transmission resources may be allocated to the UE. To allocate the S-PRS transmission resources to the UE, the BS may consider DCI, Uu-RRC, or a higher-layer indication method from the location server through the positioning protocol. In the disclosure, the corresponding indication method is not limited to a specific method. The UE may indicate information on the S-PRS transmission resources allocated by the BS to another neighbor UE when the S-PRS is transmitted. As the corresponding indication method, SCI may be considered. When information on S-PRS transmission resources selected and reserved by the UE is indicated through the SCI, the neighbor UE may decode the SCI through sensing to detect resource information selected and reserved by another UE and perform the operation of scheme 2 through RSRP measurement.

When UE-A receives allocation of transmission resources of the S-PRS 705-1 and the S-PRS 707-1 from the BS through scheme1, UE-A may unicast or groupcast the S-PRS to the neighbor UE. Subsequently, when UE-B receives a request for performing the RTT, selection of resources for transmitting the S-PRS 706-1 and providing the value of $T_{reply}$ 702 by UE-B may be performed through various methods. When UE-A is the entity of positioning, UE-B may additionally provide the value of $T_{round}$ 704 to UE-A. Further, resource selection therefor may be additionally needed. As described above, the number of UEs-B may be one or plural. When a plurality of UEs-B are considered, a plurality of transmission resources of the S-PRS 706-1 transmitted by the plurality of UEs-B may be selected to not collide with each other. It is noted that the disclosure is not limited to the presented methods below. When one or more of the following methods are supported, the used methods may be (pre-)configured or the selected methods may be indicated.

The following methods are detailed examples of selection or allocation of transmission resources of UE-B.

Through method 2-3-1, UE-B may receive allocation of resources for transmission of the S-PRS 706-1 from the BS through scheme1 and respond to an RTT request in a unicast, groupcast, or broadcast manner. In the case of the double-sided RTT, the error according to delay may not be considered or, when the corresponding error is low, the ToF error may not be influenced by the value of $T_{reply}$ ($T_{reply1}$ or $T_{reply2}$) as shown in Equation 8. However, when the error according to delay is large, method 2-1 may be considered. According to Equation (6), the ToF error may increase as the value of ($T_{reply1}-T_{reply2}$) increases. UE-B may expect allocation of resources for transmission of the S-PRS 706-1 and the S-PRS 707-1 by the BS through method 2-2. However, when the allocated transmission resources of the S-PRS 706-1 and the S-PRS 707-1 do not satisfy ($T_{reply1}-T_{reply2}$) $\leq T_{differ\_Th}$, the UE (UE-B) may make a request for reselecting/reallocating resources to the BS and the location server. For the corresponding request, a PUCCH, a PUSCH, Uu-RRC, a Uu MAC-CE, or higher-layer indication methods through a positioning protocol may be considered. However, when the allocated transmission resources of the S-PRS 706-1 and the S-PRS 707-1 do not satisfy $(T_{reply1}-T_{reply2}) \leq T_{differ\_Th}$, the UE may not respond to the RTT request. This may be interpreted as an operation of refraining from transmitting the S-PRS and refraining from providing the values of $T_{reply}$ and $T_{round}$ to UE-A.

Through method 2-3-2, UE-B may directly select and allocate transmission resources of the S-PRS 706-1 through scheme 2 and respond to an RTT request in a unicast, groupcast, or broadcast manner. Transmission resources of the S-PRS 706-1 may be selected in consideration of method 2-1 and method 2-2.

Through method 2-3-3, UE-B may receive allocation of the transmission resources of the S-PRS 706-1 from UE-A and respond to the RTT request in a unicast manner. The UE (UE-A) may select transmission resources of the S-PRS 706-1 in consideration of method 2-1 and method 2-2.

Through method 2-3-4, UE-B may receive allocation of the transmission resources of the S-PRS 706-1 from UE-A and respond to the RTT request in a unicast manner. The UE (UE-A) may transfer the transmission resources of the S-PRS 706-1 allocated by the BS through scheme1 to UE-B. The BS may select transmission resources of the S-PRS 706-1 in consideration of method 2-1 and method 2-2. When UE-A transfers the transmission resources allocated by the BS to UE-B, SCI, PC5-RRC, an SL MAC-CE, or higher-layer indication methods from the location server through a positioning protocol may be considered for the corresponding information. When the transmission resources of the S-PRS 706-1 do not satisfy $T_{reply} \leq T_{reply\_Th}$, UE-B may not transmit a response to the RTT request to UE-A. This may be interpreted as an operation of refraining from transmitting the S-PRS and refraining from providing the value of $T_{reply}$ to UE-A.

Method 2-4

In method 2-4, scheme 2 is considered for selection and allocation of S-PRS transmission resources of UE-A. UE-A may directly select and allocate S-PRS transmission resources to measure the ToF using the RTT. The UE may select S-PRS transmission resources in consideration of method 2-1 and method 2-2. Information on the S-PRS transmission resources selected and reserved by the UE may be indicated to another neighbor UE when the S-PRS is transmitted. As the corresponding indication method, SCI may be considered. When information on S-PRS transmission resources selected and reserved by the UE is indicated through the SCI, the neighbor UE may decode the SCI through sensing to detect resource information selected and reserved by another UE and perform the operation of scheme 2 through RSRP measurement.

UE-A determining the S-PRS transmission resources through scheme 2 may unicast, groupcast, or broadcast the S-PRS 705-1 and the S-PRS 707-1 to the neighbor UE. Subsequently, when the neighbor UE (UE-B) receives a request for performing the RTT, selection of resources for transmitting the S-PRS 706-1 and providing the value of $T_{reply}$ 702 by UE-B may be performed through various methods. As described above, the number of UEs-B may be one or plural. When UE-A is the entity of positioning, UE-B may additionally provide the value of $T_{round}$ 704. Resource selection therefor may be additionally needed. As described above, the number of UEs-B may be one or plural. When a plurality of UEs-B are considered, a plurality of transmission resources of the S-PRS 706-1 transmitted by the plurality of UEs-B may be selected to not collide with each other.

The following methods are detailed examples of selection or allocation of transmission resources of UE-B.

Through method 2-4-1, UE-B may receive allocation of resources for transmission of the S-PRS 706-1 from the BS through scheme1 and respond to an RTT request in a unicast, groupcast, or broadcast manner. In the case of the double-sided RTT, the error according to delay may not be considered or, when the corresponding error is low, the ToF error may not be influenced by the value of $T_{reply}$ ($T_{reply1}$ or $T_{reply2}$) as shown in Equation (8). However, when the error according to delay is large, method 2-1 may be considered. In Equation (6), the ToF error may increase as the value of $(T_{reply1}-T_{reply2})$ increases. UE-B may expect allocation of resources for transmission of the S-PRS 706-1 and the S-PRS 707-1 by the BS through method 2-2. However, when the allocated transmission resources of the S-PRS 706-1 and the S-PRS 707-1 do not satisfy $(T_{reply1}-T_{reply2}) \leq T_{differ\_Th}$, UE-B may make a request for reselecting/reallocating resources to the BS and the location server. For the corresponding request, a PUCCH, a PUSCH, Uu-RRC, a Uu MAC-CE, or higher-layer indication methods through a positioning protocol may be considered. However, when the allocated transmission resources of the S-PRS 706-1 and the S-PRS 707-1 do not satisfy $(T_{reply1}-T_{reply2}) \leq T_{differ\_Th}$, the UE may not respond to the RTT request. This may be interpreted as an operation of refraining from transmitting the S-PRS and refraining from providing the values of $T_{reply}$ and $T_{round}$ to UE-A.

Through method 2-4-2, UE-B may directly select and allocate transmission resources of the S-PRS 706-1 through scheme 2 and respond to an RTT request in a unicast, groupcast, or broadcast manner. The UE may select transmission resources of the S-PRS 706-1 in consideration of method 2-1 and method 2-2.

Through method 2-4-3, UE-B may receive allocation of the transmission resources of the S-PRS 706-1 from UE-A and respond to the RTT request in a unicast manner. The UE (UE-A) may select transmission resources of the S-PRS 706-1 in consideration of method 2-1 and method 2-2.

Through method 2-4-4, UE-B may receive allocation of the transmission resources of the S-PRS 706-1 from UE-A and respond to the RTT request in a unicast manner. The UE (UE-A) may transfer the transmission resources of the S-PRS 706-1 allocated by the BS through scheme1 to UE-B. The BS may select transmission resources of the S-PRS 706-1 in consideration of method 2-1 and method 2-2. When UE-A transfers the transmission resources allocated by the BS to UE-B, SCI, PC5-RRC, an SL MAC-CE, or higher-layer indication methods from the location server through a positioning protocol may be considered for the corresponding information. When the transmission resources of the S-PRS 706-1 do not satisfy $T_{reply} \leq T_{reply\_Th}$, UE-B may not transmit a response to the RTT request to UE-A. This may be interpreted as an operation of refraining from transmitting the S-PRS and refraining from providing the value of $T_{reply}$ to UE-A.

Third Embodiment

The third embodiment presents a new RTT method different from the RTT methods presented in FIG. 7, thereby solving the problem which may be generated by the conventional RTT.

In the case of the RTT method presented through section (a) in FIG. 7, it has been described that the error may be generated by the clock source during ToF measurement and delay during the RTT process and an amount of the error may be increased by selection of the value of $T_{reply}$. In the case of the RTT method presented through section (b) in FIG. 7, influence of the error by the clock source may be minimized but it is required to indicate $T_{reply1}$ and $T_{round2}$ information calculated by UE-B to UE-A for calculation of the ToF by UE-A. Unlike this, when UE-B calculates ToF, it is required to indicate $T_{round1}$ and $T_{reply2}$ information calculated by UE-A to UE-B. During the process, frequency selection of the resources may be needed, and a long delay time and inconvenience of the operation to calculate the ToF may be generated compared to the single-sided RTT.

Method 3-1

Figure 8:
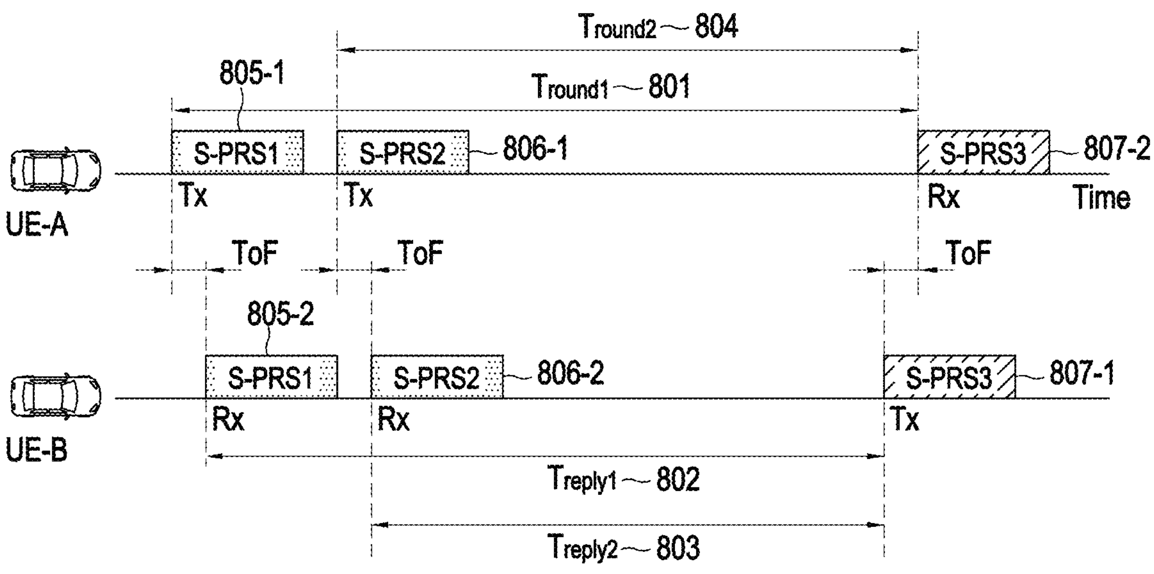
FIG. 8 illustrates a new RTT method according to an embodiment.

FIG. 8 illustrates a new RTT method according to an embodiment.

Referring to FIG. 8, the new RTT method, that is, method 3-1 is illustrated. In FIG. 8, an entity which performs SL positioning may be UE-A. The entity which performs positioning may measure the ToF and acquire a position of the UE (distance and coordinate information). UE-A may make a request for performing the RTT to a neighbor UE to directly perform positioning. UE-A may be triggered by another UE, the BS, or the location server to perform positioning.

In FIG. 8, RTT measurement may be performed as UE-A transmits positioning signals 805-1 and 806-1 to UE-B successively two times and UE-B transmits a positioning signal 807-1 to UE-A in response thereto.

In the case of method 3-1, it may be interpreted that a transmission order of S-PRSs transmitted by UE-A is different compared to the RTT method presented through section (b) in FIG. 7. In section (b) in FIG. 7, the RTT may be performed in the order that UE-A first transmits the S-PRS, receives the S-PRS transmitted by UE-B, and then transmits again the S-PRS. However, in new RTT method 3-1, the RTT may be performed in the order that UE-A first transmits the S-PRS two times then receives the S-PRS transmitted by UE-B. The method of calculating the ToF through new RTT method 3-1 is described with reference to Equation 9 below. Method 3-1 may obtain the same effect as the double-sided RTT in section (b) in FIG. 7. In other words, an error influence by the clock source can be minimized. However, method 3-1 may have the following characteristics compared to the double-sided RTT in section (b) in FIG. 7.

Characteristic 1: when UE-A should perform ToF measurement, method 3-1 may reduce the delay time compared to the double-sided RTT in section (b) in FIG. 7. Specifically, while UE-B should perform two signal transmissions (transmission of the S-PRS 706 and transmission of measured $T_{round2}$ 704) to UE-A in the double-sided RTT in section (b) in FIG. 7, UE-B only needs to perform one signal transmission (also transmits $T_{reply}$ measured when the S-PRS 807-1 is transmitted) to UE-A in method 3-1.

Characteristic 2: in the case of the double-sided RTT in section (b) in FIG. 7, UE-A transmits the S-PRS 705-1, receives the S-PRS 706-2 from UE-B, and then transmits the S-PRS 707-1 from a viewpoint of selection of resources for S-PRS transmission. Accordingly, UE-A may independently select resources for transmission of the S-PRS 705-1 and the S-PRS 707-1. Although UE-A does not independently select the resources for transmission of the S-PRS 705-1 and the S-PRS 707-1, the resources for transmission of the S-PRS 707-1 should be selected after reception of the S-PRS 706-2 from UE-B, and thus such a matter (selection should be performed after reception of the S-PRS 706-2) should be considered. However, in method 3-1, transmission of the S-PRSs 805-1 and 806-1 is performed successively two times and thus it is preferable that UE-A selects resources for transmission of the S-PRS 805-1 and the S-PRS 806-1 at the same time. Accordingly, selection of the resources for S-PRS transmission may be more efficiently performed.

Characteristic 3: in the case of the double-sided RTT in section (b) in FIG. 7, it is required to generally make the values of $T_{reply1}$ 702 and $T_{reply2}$ 703 almost the same according to Equation (6) in order to make the ToF measurement error smaller. This may be another restriction in selection of the resources for S-PRS transmission. However, in Equation (9) below, such a restriction is not generated in method 3-1, in which a clock difference between UEs may be corrected.

Method 3-2

Figure 9:
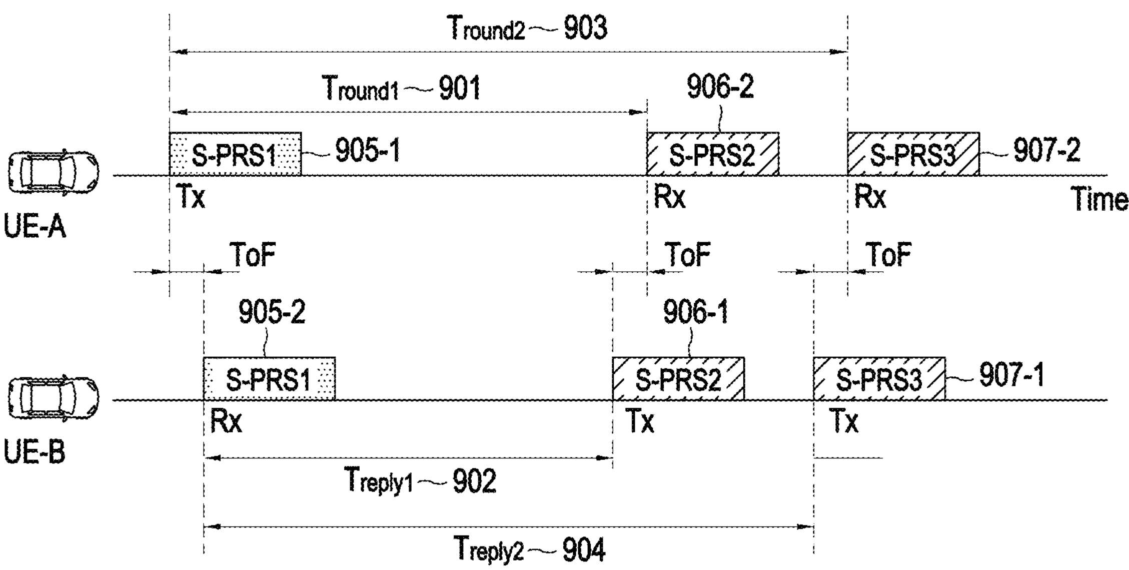
FIG. 9 illustrates a new RTT method according to an embodiment.

FIG. 9 illustrates a new RTT method according to an embodiment.

Referring to FIG. 9, the new RTT method, that is, method 3-2 is illustrated. According to FIG. 9, RTT measurement may be performed as UE-A transmits a positioning signal 905-1 to UE-B and UE-B transmits positioning signals 906-1 and 907-1 to UE-A to UE-A successively two times. In the case of method 3-2, an entity which transmits the positioning signals successively two times may be interpreted as UE-B rather than UE-A, compared to method 3-1. In FIG. 9, UE-B transmits the positioning signals successively two times, and thus it is preferable to select resources for transmission of the S-PRS 906-1 and the S-PRS 907-1 at the same time. Accordingly, selection of the resources for S-PRS transmission may be more efficiently performed. Therefore, the same effect as the double-sided RTT in section (b) in FIG. 7 may be obtained. In other words, an error influence by the clock source can be minimized. Compared to double-sided RTT in section (b) in FIG. 7, method 3-2 may have the same characteristics as method 3-1 described above.

In presented new RTT method 3-1, the ToF may be calculated as shown below in Equation (9).

$$ToF = \frac{1}{2}(T_{round1} - \delta \cdot T_{reply1}) \qquad (9)$$

$$\delta = \frac{T_{round1} - T_{round2}}{T_{reply1} - T_{reply2}}$$

In Equation (9), values of $T_{round1}$, $T_{round2}$, $T_{reply1}$, and $T_{reply2}$ are described with reference to FIG. 8, 6 denotes a correction coefficient, and the corresponding value indicates a clock velocity difference between two UEs, that is, UE-A and UE-B in FIG. 8. In other words, it may be interpreted to synchronize the time zone by the clock of UE-B with the time zone by the clock of UE-A through the corresponding correction coefficient. The correction coefficient may be determined as a ratio of the difference between response times ($T_{reply1}$, $T_{reply2}$) determined by UE-B to the difference between RTTs ($T_{round1}$, $T_{round2}$) determined by UE-A, and thus may represent the clock difference between UEs. In the ToF calculation in Equation 9, since $T_{reply1}$ is a value reported by UE-B, the correction coefficient is applied to $T_{reply1}$ in order to synchronize the same with the time zone such as $T_{reply1}$ determined by UE-A.

In presented new RTT method 3-2, the ToF may be calculated as shown below in Equation (10).

$$ToF = \frac{1}{2}(T_{round1} - \delta \cdot T_{reply1}) \qquad (10)$$
$$\delta = \frac{T_{round2} - T_{round1}}{T_{reply2} - T_{reply1}}$$

In Equation (10), values of $T_{round1}$, $T_{round2}$, $T_{reply1}$, and $T_{reply2}$ are described with reference to FIG. 9, 8 denotes a correction coefficient, and the corresponding value indicates a clock velocity difference between two UEs, that is, UE-A and UE-B in FIG. 9. In other words, it may be interpreted to synchronize the time zone by the clock of UE-B with the time zone by the clock of UE-A through the corresponding correction coefficient.

In the disclosure, one of presented new RTT method 3-1 or 3-2 may be selected. Alternatively, the two methods may be simultaneously supported and used.

Fourth Embodiment

In the fourth embodiment, method 4-1 or method 4-2 is described for a more detailed new RTT method (method 3-1) presented in embodiment 3.

Referring to FIG. 8, resources of the S-PRSs 805-1 and 806-1 which UE-A transmits to UE-B and resources of the S-PRS 807-1 which UE-B transmits to UE-A in order to perform new RTT method 3-1 should be selected and allocated. Although FIG. 8 illustrates only one UE-B for convenience of description, the number of UEs-B may be plural. When a plurality of UEs-B is considered, a plurality of transmission resources of the S-PRS 807-1 transmitted by the plurality of UEs-B may be selected to not collide with each other. Selection of transmission resources of the S-PRSs 805-1 and 806-1 may be performed at the same time. In other words, in resource selection, two resources may be selected at a time. Selection of the transmission resources of the S-PRSs 805-1 and 806-1 may be performed to not collide with the resources selected by another UE. Compared to the conventional single-sided and double-sided schemes, in the case of new RTT method 4-1, there are smaller restrictions in resource selection for the purpose of reducing the ToF measurement error when resources are selected. Specifically, method 1-1 in the first embodiment, and method 2-1 and method 2-2 in the second embodiment may not be required.

Method 4-1

Method 4-1 considers scheme1. UE-A will receive allocation of resources for transmission of the S-PRSs 805-1 and 806-1 from the BS to measure the ToF using the RTT. To allocate the S-PRS transmission resources to the UE, the BS may consider DCI, Uu-RRC, or a higher-layer indication method from the location server through the positioning protocol. When transmitting the S-PRS, the UE may indicate information on the S-PRS transmission resources allocated by the BS to another neighbor UE. As the corresponding indication method, SCI may be considered. When information on S-PRS transmission resources selected and reserved by the UE is indicated through the SCI, the neighbor UE may decode the SCI through sensing to detect resource information selected and reserved by another UE and perform the operation of scheme 2 through RSRP measurement.

When UE-A receives allocation of transmission resources of the S-PRSs 805-1 and 806-1 from the BS through scheme1, UE-A may unicast, groupcast, or broadcast the S-PRSs 805-1 and 806-1 to the neighbor UE. Subsequently, when UE-B receives a request for performing the RTT, selection of resources for transmitting the S-PRS 807-1 and providing the values of $T_{reply}$ 802 and $T_{reply2}$ 803 by UE-B may be performed through various methods. As described above, the number of UEs-B may be one or plural. When a plurality of UEs-B are considered, a plurality of transmission resources of the S-PRS 807-1 transmitted by the plurality of UEs-B may be selected to not collide with each other.

The following methods are detailed examples of selection or allocation of transmission resources of UE-B.

Through method 4-1-1, UE-B may receive allocation of resources for transmission of the S-PRS 807-1 from the BS through scheme1 and respond to an RTT request in a unicast, groupcast, or broadcast manner.

Through method 4-1-2, UE-B may directly select and allocate transmission resources of the S-PRS 807-1 through scheme 2 or respond to an RTT request in a unicast, groupcast, or broadcast manner.

Through method 4-1-3, UE-B may receive allocation of the transmission resources of the S-PRS 807-1 from UE-A and respond to the RTT request in a unicast manner. When resource selection by scheme 2 is triggered for UE-B, UE-A may select the S-PRS transmission resources 807-1 in a resource selection window at the same. The corresponding method may be referred to as an inter-UE coordination scheme.

Through method 4-1-4, UE-B may receive allocation of the transmission resources of the S-PRS 807-1 from UE-A and respond to the RTT request in a unicast manner. The UE (UE-A) may transfer the transmission resources of the S-PRS 807-1 allocated by the BS through scheme1 to UE-B. When UE-A transfers the transmission resources allocated by the BS to UE-B, SCI, PC5-RRC, an SL MAC-CE, or higher-layer indication methods from the location server through a positioning protocol may be considered for the corresponding information.

Method 4-2

Method 4-2 considers scheme 2. UE-A may directly select and allocate transmission resources of the S-PRSs 805-1 and 806-1 to measure the ToF using the RTT. When resource selection by scheme 2 is triggered, the UE may select transmission resources of two S-PRSs 805-1 and 806-1 in the resource selection window at the same time. Information on the S-PRS transmission resources selected and reserved by the UE may be indicated to another neighbor UE when the S-PRS is transmitted. As the corresponding indication method, SCI may be considered. When information on S-PRS transmission resources selected and reserved by the UE is indicated through the SCI, the neighbor UE may decode the SCI through sensing to detect resource information selected and reserved by another UE and perform the operation of scheme 2 through RSRP measurement.

UE-A determining the S-PRS transmission resources through scheme 2 may unicast, groupcast, or broadcast the S-PRSs 805-1 and 806-1 to the neighbor UE. Subsequently, when UE-B receives a request for performing the RTT, selection of resources for transmitting the S-PRS 807-1 and providing the values of $T_{reply}$ 802 and $T_{reply2}$ 803 by UE-B may be performed through various methods. As described above, the number of UEs-B may be one or plural. When a plurality of UEs-B is considered, a plurality of transmission resources of the S-PRS 807-1 transmitted by the plurality of UEs-B may be selected to not collide with each other.

The following methods are detailed examples of selection or allocation of transmission resources of UE-B.

Through method 4-2-1, UE-B may receive allocation of resources for transmission of the S-PRS 807-1 from the BS through scheme1 and respond to an RTT request in a unicast, groupcast, or broadcast manner.

Through method 4-2-2, UE-B may directly select and allocate transmission resources of the S-PRS 807-1 through scheme 2 and respond to an RTT request in a unicast, groupcast, or broadcast manner.

Through method 4-2-3, UE-B may receive allocation of the transmission resources of the S-PRS 807-1 from UE-A and respond to the RTT request in a unicast manner. The corresponding method may be referred to as an inter-UE coordination scheme.

Through method 4-2-4, UE-B may receive allocation of the transmission resources of the S-PRS 807-1 from UE-A and respond to the RTT request in a unicast manner. The UE (UE-A) may transfer the transmission resources of the S-PRS 807-1 allocated by the BS through scheme1 to UE-B. When UE-A transfers the transmission resources allocated by the BS to UE-B, SCI, PC5-RRC, an SL MAC-CE, or higher-layer indication methods from the location server through a positioning protocol may be considered for the corresponding information FIG. 10 illustrates a procedure in which the UE performing SL communication performs a new RTT method to identify the location according to an embodiment.

Figure 10:
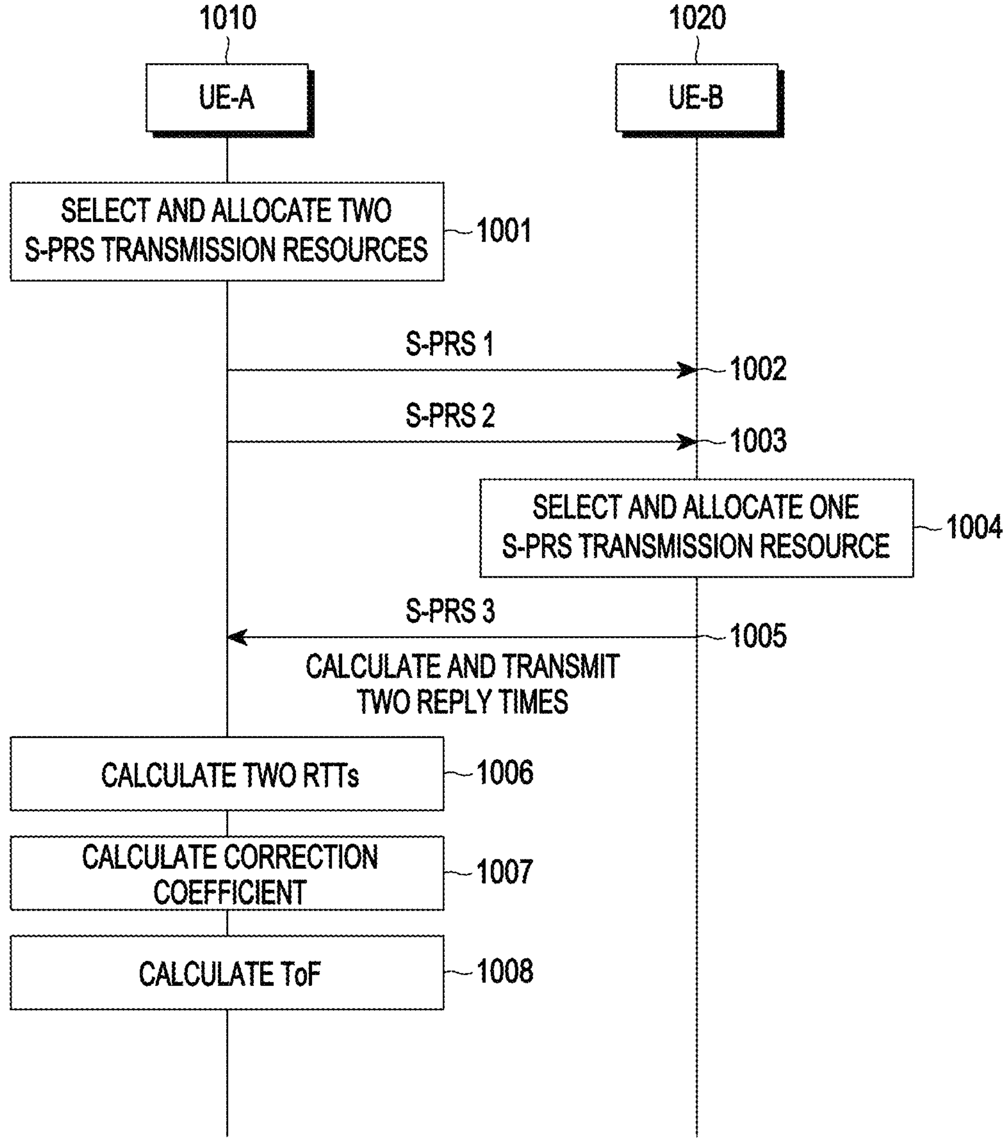
FIG. 10 illustrates a procedure in which the UE performing SL communication performs a new RTT method to identify the location according to an embodiment.

Referring to FIG. 10, a procedure of performing new RTT method 3-1 is illustrated to identify the location of the UE performing SL communication.

In FIG. 10, UE-A 1010 and UE-B 1020 are described for convenience of description. UE-A 1010 and UE-B 1020 refer to specific UEs in the case of unicast, refers to UEs within a group in the case of groupcast, and refers to a random UE rather than a specific UE in the case of broadcast.

UE-A 1010 may select two S-PRS resources in step 1001. It is assumed that the S-PRS transmitted through the resources ahead in time among the two selected resources is S-PRS1 and the S-PRS transmitted through the resources behind is S-PRS2.

UE-A 1010 may transmit S-PRS1 in step 1002 and transmit S-PRS2 in step 1003.

UE-B 1020 may receive S-PRS1 or S-PRS2 transmitted from UE-A 1010.

UE-B 1020 may select and allocate one S-PRS transmission resource according to a request for performing the RTT and transmit the same to UE-A 1010 in step 1004. The request for performing the RTT may be indicated from UE-A 1010, another UE other than UE-A 1010, the BS, or the location server. When the indication is from UE-A 1010, the corresponding indication may be inserted into SCI and transmitted when S-PRS1 or S-PRS2 is transmitted as 1-bit information. It is assumed that the S-PRS transmitted through the resources selected in step 1004 is S-PRS3.

UE-B 1020 may calculate the time difference between the time at which S-PRS1 and S-PRS2 are received and the time at which S-PRS3 is transmitted while transmitting S-PRS3 to UE-A 1010 in step 1005. The difference between the time at which S-PRS1 is received and the time at which S-PRS3 is transmitted may be expressed as $T_{reply1}$ and the difference between the time at which S-PRS2 is received and the time at which S-PRS3 is transmitted may be expressed as $T_{reply2}$. UE-B 1020 may provide values corresponding to $T_{reply1}$ and $T_{reply2}$ while transmitting S-PRS3 in step 1005. At this time, an indication of the corresponding information may be performed through various methods. For example, various methods, such as SCI (1$^{st}$ SCI and 2$^{nd}$ SCI), a PSSCH, or an SL MAC-CE, may be considered. Unlike this, the values corresponding to $T_{reply1}$ and $T_{reply2}$ may not be provided simultaneously with transmission of S-PRS3. In such a case, the SCI (1$^{st}$ SCI and 2$^{nd}$ SCI), the PSSCH, the SL MAC-CE, PC5-RRC, or higher-layer indication methods from the location server through a positioning protocol may be considered. The disclosure is not limited to a specific indication method.

When receiving S-PRS3, UE-A 1010 may calculate two RTTs in step 1006. The first RTT $T_{round1}$ may be calculated as a time difference between transmission of S-PRS1 in step 1002 and reception of S-PRS3 in step 1005. The second RTT $T_{round2}$ may be calculated as a time difference between transmission of S-PRS2 in step 1003 and reception of S-PRS3 in step 1005.

UE-A 1010 may calculate the correction coefficient through Equation 9 in step 1007 and measure the ToF in step 1008.

Fifth Embodiment

In the fifth embodiment, the new RTT method (method 3-2) presented in the third embodiment is described in more detail through method 5-1 and method 5-2.

Referring to FIG. 9, resources of the S-PRS 905-1 which UE-A transmits to UE-B and resources of the S-PRSs 906-1 and 907-1 which UE-B transmits to UE-A in order to perform new RTT method 3-2 should be selected and allocated. Although FIG. 9 illustrates only one UE-B for convenience of description, the number of UEs-B may be plural. When a plurality of UEs-B is considered, a plurality of transmission resources of the S-PRSs 906-1 and 907-1 transmitted by the plurality of UEs-B may be selected to not collide with each other. Selection of the transmission resources of the S-PRSs 906-1 and 907-1 may be performed at the same time. In other words, in resource selection, two resources may be selected at a time. Selection of the S-PRS transmission resources 905-1 should be performed to not collide with the resources selected by another UE.

Compared to the conventional single-sided and double-sided schemes, in the case of new RTT method 3-2, there are smaller restrictions in resource selection to reduce the ToF measurement error when resources are selected. Specifically, method 1-1 in the first embodiment, and method 2-1 and method 2-2 in the second embodiment may not be required. A resource selection method and an RTT operation procedure in when new RTT method 3-2 is performed is described below.

Method 5-1

Method 5-1 considers scheme1. UE-A will receive allocation of resources for transmission of the S-PRS 905-1 from the BS to measure the ToF using the RTT. To allocate the S-PRS transmission resources to the UE, the BS may consider DCI, Uu-RRC, or a higher-layer indication method from the location server through the positioning protocol. When transmitting the S-PRS, the UE may indicate information on the S-PRS transmission resources allocated by the BS to another neighbor UE. As the corresponding indication method, SCI may be considered. When information on S-PRS transmission resources selected and reserved by the UE is indicated through the SCI, the neighbor UE may decode the SCI through sensing to detect resource information selected and reserved by another UE and perform the operation of scheme 2 through RSRP measurement.

When UE-A receives allocation of transmission resources of the S-PRS 905-1 from the BS through scheme1, UE-A may unicast, groupcast, or broadcast the S-PRS 905-1 to the neighbor UE. Subsequently, when UE-B receives a request for performing the RTT, selection of resources for transmitting the S-PRSs 906-1 and 907-1 and providing the values of $T_{reply1}$ 902 and $T_{reply2}$ 904 by UE-B may be performed through various methods. As described above, the number of UEs-B may be one or plural. When a plurality of UEs-B are considered, a plurality of transmission resources of the S-PRSs 906-1 and 907-1 transmitted by the plurality of UEs-B may be selected to not collide with each other.

The following methods are detailed examples of selection or allocation of transmission resources of UE-B.

Through method 5-1-1, UE-B may receive allocation of resources for transmission of the S-PRSs 906-1 and 907-1 from the BS through scheme1 and respond to an RTT request in a unicast, groupcast, or broadcast manner.

Through method 5-1-2, UE-B may directly select and allocate transmission resources of the S-PRSs 906-1 and 907-1 through scheme 2 and respond to an RTT request in a unicast, groupcast, or broadcast manner. When resource selection by scheme 2 is triggered, the UE may select transmission resources of two S-PRSs 906-1 and 907-1 in the resource selection window at the same time.

Through method 5-1-3, UE-B may receive allocation of the transmission resources of the S-PRSs 906-1 and 907-1 from UE-A and respond to the RTT request in a unicast manner. When resource selection by scheme 2 is triggered for UE-B, UE-A may select the transmission resources of the two S-PRSs 906-1 and 907-4 in the resource selection window at the same. The corresponding method may be referred to as an inter-UE coordination scheme.

Through method 5-1-4, UE-B may receive allocation of the transmission resources of the S-PRSs 906-1 and 907-1 from UE-A and respond to the RTT request in a unicast manner. The UE (UE-A) may transfer the transmission resources of the S-PRSs 906-1 and 907-1 allocated by the BS through scheme1 to UE-B. When UE-A transfers the transmission resources allocated by the BS to UE-B, SCI, PC5-RRC, an SL MAC-CE, or higher-layer indication methods from the location server through a positioning protocol may be considered for the corresponding information.

Method 5-2

Method 5-2 considers scheme 2. UE-A may directly select and allocate transmission resources of the S-PRS 905-1 to measure the ToF using the RTT. Information on the S-PRS transmission resources selected or reserved by the UE may be indicated to another neighbor UE when the S-PRS is transmitted. As the corresponding indication method, SCI may be considered. When information on S-PRS transmission resources selected and reserved by the UE is indicated through the SCI, the neighbor UE may decode the SCI through sensing to detect resource information selected and reserved by another UE and perform the operation of scheme 2 through RSRP measurement.

UE-A determining the S-PRS transmission resources through scheme 2 may unicast, groupcast, or broadcast the S-PRS 905-1 to UE-B. Subsequently, when the neighbor UE (UE-B) receives a request for performing the RTT, selection of resources for transmitting the S-PRSs 906-1 and 907-1 and providing the values of $T_{reply1}$ 902 and $T_{reply2}$ 904 by UE-B may be performed through various methods. As described above, the number of UEs-B may be one or plural. When a plurality of UEs-B is considered, a plurality of transmission resources of the S-PRSs 906-1 and 907-1 transmitted by the plurality of UEs-B may be selected to not collide with each other.

The following methods are detailed examples of selection or allocation of transmission resources of UE-B.

Through method 5-2-1, UE-B may receive allocation of resources for transmission of the S-PRSs 906-1 and 907-1 from the BS through scheme1 and respond to an RTT request in a unicast, groupcast, or broadcast manner.

Through method 5-2-2, UE-B may directly select and allocate transmission resources of the S-PRSs 906-1 and 907-1 through scheme 2 and respond to an RTT request in a unicast, groupcast, or broadcast manner. When resource selection by scheme 2 is triggered, the UE may select transmission resources of two S-PRSs 906-1 and 907-1 in the resource selection window at the same time.

Through method 5-2-3, UE-B may receive allocation of the transmission resources of the S-PRSs 906-1 and 907-1 from UE-A and respond to the RTT request in a unicast manner. When resource selection by scheme 2 is triggered for UE-B, UE-A may select transmission resources of the two S-PRSs 906-1 and 907-1 in the resource selection window at the same. The corresponding method may be referred to as an inter-UE coordination scheme.

Through method 5-2-4, UE-B may receive allocation of the transmission resources of the S-PRSs 906-1 and 907-1 from UE-A and respond to the RTT request in a unicast manner. The UE (UE-A) may transfer the transmission resources of the S-PRSs 906-1 and 907-1 allocated by the BS through scheme1 to UE-B. When UE-A transfers the transmission resources allocated by the BS to UE-B, SCI, PC5-RRC, an SL MAC-CE, or higher-layer indication methods from the location server through a positioning protocol may be considered for the corresponding information.

Figure 11:
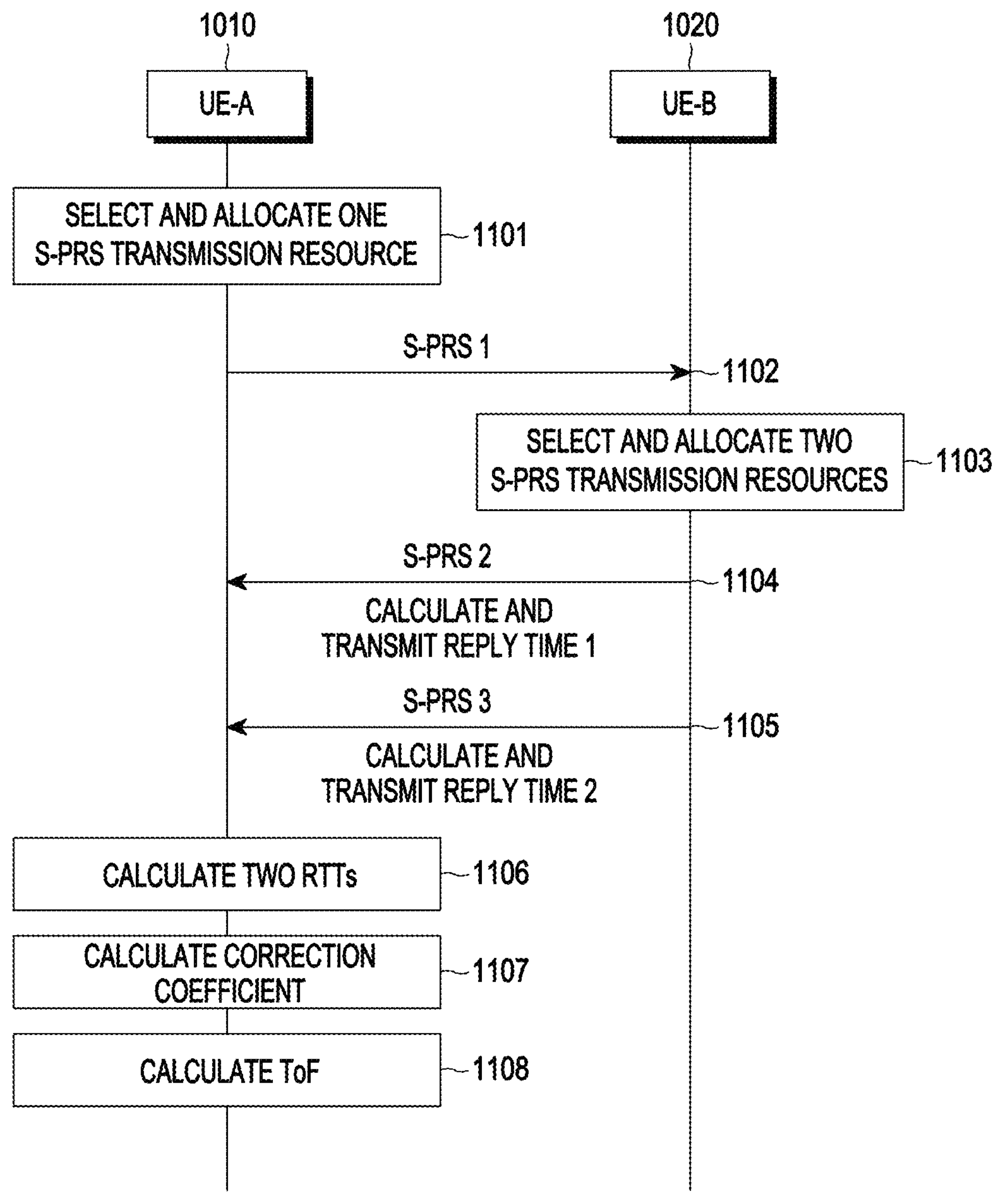
FIG. 11 illustrates a procedure in which the UE performing SL communication performs a new RTT method to identify the location according to an embodiment.

FIG. 11 illustrates a procedure in which the UE performing SL communication performs a new RTT method to identify the location according to an embodiment.

Referring to FIG. 11, a procedure of performing new RTT method 3-2 is illustrated to identify the location of the UE performing SL communication.

In FIG. 11, UE-A 1010 and UE-B 1020 are described for convenience of description. It is noted that the UEs may refer to specific UEs in the case of unicast, refer to UEs within a group in the case of groupcast, and refer to random UEs rather than specific UEs in the case of broadcast.

UE-A 1010 may select one S-PRS resource in step 1101. It is assumed that the S-PRS transmitted through the resource selected in step 1101 is S-PRS1.

UE-A 1010 may transmit S-PRS1 to UE-B 1020 in step 1102 where UE-B 1020 may receive S-PRS1 transmitted from UE-A 1010.

UE-B 1020 may select and allocate two S-PRS transmission resources according to a request for performing the RTT and transmit the same to UE-A 1010 in step 1103. The request for performing the RTT may be indicated from UE-A 1010, another UE other than UE-A 1010, the BS, or the location server. When the indication is from UE-A 1010, the corresponding indication may be inserted into SCI and transmitted when S-PRS1 is transmitted as 1-bit information. It is assumed that the S-PRS transmitted through the resources ahead in time among the two resources selected in step 1103 is S-PRS2 and the S-PRS transmitted through the resources behind is S-PRS3.

UE-B 1020 may transmit S-PRS2 in step 1104 and transmit S-PRS3 in step 1105. UE-B 1020 may calculate a time difference ($T_{reply1}$) between the time at which S-PRS1 is received and the time at which S-PRS2 is transmitted while transmitting S-PRS2 to UE-A 1010 in step 1104. UE-B 1020 may calculate a time difference ($T_{reply2}$) between the time at which S-PRS1 is received and the time at which S-PRS3 is transmitted while transmitting S-PRS3 to UE-A 1010 in step 1105. UE-B 1020 may provide values corresponding to $T_{reply1}$ and $T_{reply2}$ while transmitting S-PRS2 and S-PRS3 in step 1104 and operation 1105. An indication of the corresponding information may be performed through various methods. For example, various methods, such as SCI ($1^{st}$ SCI and $2^{nd}$ SCI), a PSSCH, or an SL MAC-CE, may be considered. The values corresponding to $T_{reply1}$ and $T_{reply2}$ may not be provided simultaneously with transmission of the S-PRS (each of S-PRS2 and S-PRS3). In such a case, the SCI ($1^{st}$ SCI and $2^{nd}$ SCI), the PSSCH, the SL MAC-CE, PC5-RRC, or higher-layer indication methods from the location server through a positioning protocol may be considered. The disclosure is not limited to a specific indication method.

When receiving S-PRS2 and S-PRS3, UE-A 1010 may calculate two RTTs in step 1106. The first RTT $T_{round1}$ may be calculated as a time difference between transmission of S-PRS1 in step 1102 and reception of S-PRS2 in step 1104. The second RTT $T_{round2}$ may be calculated as a time difference between transmission of S-PRS1 in step 1102 and reception of S-PRS3 in step 1105.

UE-A 1010 may calculate a correction coefficient through Equation 10 in step 1107 and measure the ToF in step 1108.

Sixth Embodiment

The sixth embodiment presents a detailed operation in which the UE (UE-B) receiving the RTT request in the SL directly selects and allocates S-PRS transmission resources through scheme 2 and respond to the RTT request of UE-A in a unicast, groupcast, or broadcast manner. A method applied to a resource selection process is described through method 1-2, method 1-3, method 2-3, and method 2-4 presented in the first embodiment and the second embodiment.

To reduce the ToF measurement error, method 1-1 (threshold value $T_{reply\_Th}$ for $T_{reply}$) in the first embodiment (single-sided RTT), and method 2-1 (threshold value $T_{reply\_Th}$ for $T_{reply}$) and method 2-2 (threshold value $T_{differ\_Th}$ for ($T_{reply1}-T_{reply2}$)) in the second embodiment (double-sided RTT) is disclosed. According to the corresponding methods, when resources reserved or selected by S-PRS transmission do not satisfy the condition presented in method 2-1 and method 2-2, reselection of S-PRS resources may triggered or the resource selection procedure may be performed to satisfy the condition presented in method 2-1 and method 2-2 when S-PRS resource selection is triggered. It is noted that the threshold values according to method 2-1 method 2-2 may be replaced with other terms. A method of satisfying the condition of method 2-2 may be interpreted as an operation in which, when UE-B indicates a value corresponding to $T_{reply1}$ 702 to UE-A, the corresponding information is inserted into SCI to reserve resources. UE-A may detect the value corresponding to $T_{reply1}$ 702 and transmit the S-PRS 707-1 at the corresponding time point to make $T_{reply1}$ 702 and $T_{reply2}$ 703 the same.

Figure 12:
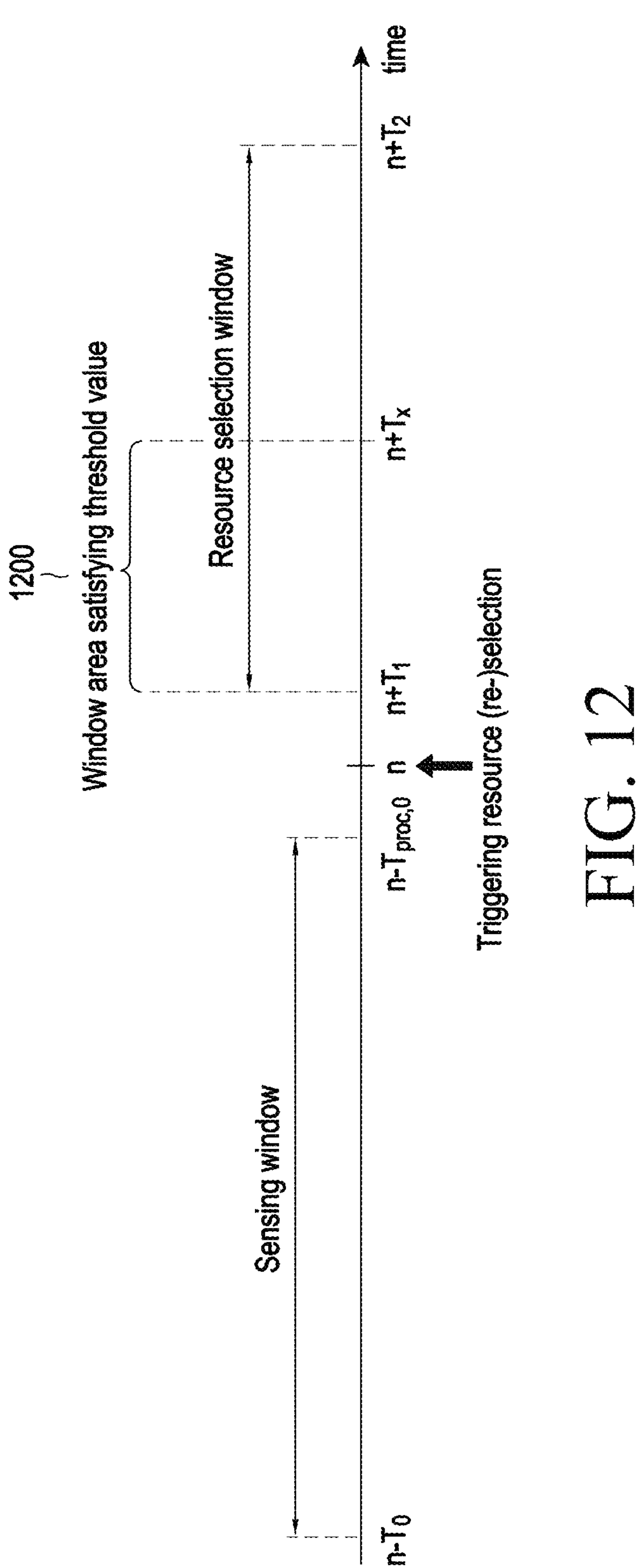
FIG. 12 illustrates a method by which the UE selects resources to satisfy a threshold value when directly selecting S-PRS transmission resources according to an embodiment.

FIG. 12 illustrates a method by which the UE selects resources to satisfy a threshold value when directly selecting S-PRS transmission resources according to an embodiment.

Referring to FIG. 12, a method by which the UE selects resources to satisfy the threshold values according to method 1-1 and method 2-1 when directly selecting S-PRS transmission resources through scheme 2 is illustrated.

In FIG. 12, the UE may perform sensing in a sensing window. Performing sensing may be defined as an operation of decoding SCI transmitted by another UE and performing RSRP measurement. SCI may include resource allocation information, and the UE may identify whether another UE occupies resources in a candidate resource area (resource selection window) which the UE desires to transmit through SCI decoding and, if occupied, detect how much influence is made through RSRP measurement. The RSRP may be RSRP measured through the S-PRS. Through the corresponding sensing, N candidate resources can be selected. However, when the resource selection area is n+$T_X$ ($T_X$<$T_2$), based on the threshold values according to method 1-1, method 2-1, and method 2-2 as illustrated in FIG. 12, the UE may select M candidate resources within the corresponding selection area (n+$T_1$ to n+$T_x$) 1200 by the sensing result. In this case, the UE may randomly select resources for S-PRS transmission in the M candidate resources selected based on the sensing result. When it is not possible to select the resources satisfying the condition, UE-B may not transmit a response to an RTT request to UE-A. This may be interpreted as an operation of not transmitting the S-PRS and not providing the value of $T_{reply}$ to UE-A.

In the first embodiment (single-sided RTT), when the UE provides the value corresponding to $T_{reply}$ to another UE, the corresponding information may be provided while the S-PRS is transmitted. Various methods, such as SCI ($1^{st}$ SCI and $2^{nd}$ SCI), a PSSCH, or an SL MAC-CE, may be considered. The value corresponding to $T_{reply}$ may not be provided simultaneously with S-PRS transmission. In such a case, the SCI ($1^{st}$ SCI and $2^{nd}$ SCI), the PSSCH, the SL MAC-CE, PC5-RRC, or higher-layer indication methods from the location server through a positioning protocol may be considered. The disclosure is not limited to a specific indication method.

In the second embodiment (double-sided RTT), when the UE provides the values corresponding to $T_{round1}$ and $T_{reply2}$ or $T_{reply1}$ and $T_{round2}$ to another UE, the corresponding information may be provided while the S-PRS is transmitted. Various methods, such as SCI ($1^{st}$ SCI and $2^{nd}$ SCI), a PSSCH, or an SL MAC-CE, may be considered. Unlike this, the values corresponding to $T_{round1}$ and $T_{reply2}$ or $T_{reply1}$ and $T_{round2}$ may not be provided simultaneously with S-PRS transmission. In such a case, the SCI ($1^{st}$ SCI and $2^{nd}$ SCI), the PSSCH, the SL MAC-CE, PC5-RRC, or higher-layer indication methods from the location server through a positioning protocol may be considered.

Seventh Embodiment

The seventh embodiment presents a detailed operation in which the UE (UE-B) receiving an RTT request in the SL receives allocation of S-PRS transmission resources from UE-A and responds to the RTT request of UE-A in a unicast manner. The corresponding method may be referred to as an inter-UE coordination scheme. A method applied to the resource selection process is described in method 1-2, method 1-3, method 2-3, method 2-4, method 4-1, and method 4-2 in the first embodiment and the second embodiment. In addition, a detailed signaling method for inter-UE coordinate is described.

When UE-A selects resources considering method 1-2, method 1-3, method 2-3, and method 2-4 proposed in the first embodiment and the second embodiment for UE-B, the method presented in the sixth embodiment may be used. To perform the resource selection method presented in the sixth embodiment, UE-A may receive additional information for resource selection from UE-B. For example, the additional information may be information related to a sensing window and resource selection of UE-B. However, the disclosure is not limited thereto.

As the method by which UE-A transfers S-PRS transmission resources information to UE-B through inter-UE coordination, various signaling methods may be considered. For example, various methods such as the SCI ($1^{st}$ SCI and $2^{nd}$ SCI), the PSSCH, the SL MAC-CE, PC5-RRC, or higher-layer indication methods from the location server through a positioning protocol may be considered. The transmitters, receivers, and processors of the UE and the BS are described below in reference to FIGS. 13 and 14. The embodiments proposes the method by which the UE performs positioning in the SL, and the receivers, the processors, and the transmitters of the BS and the UE should operate according to the embodiments to perform the method.

Figure 13:
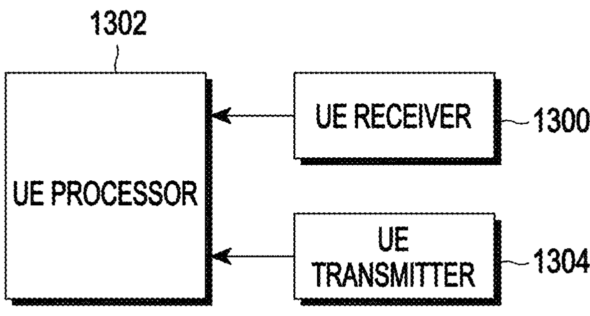
FIG. 13 illustrates a UE according to an embodiment.

FIG. 13 illustrates a UE according to an embodiment.

Referring to FIG. 13, the UE includes a UE receiver 1300, a UE transmitter 1304, and a UE processor 1302. The UE receiver 1300 and the UE transmitter 1304 may be collectively referred to as a transceiver in the embodiment. The transceiver may transmit and receive a signal to and from the BS. The signal may include control information and data. To this end, the transceiver may include an RF transmitter that up-converts and amplifies a frequency of a transmitted signal, an RF receiver that low-noise amplifies a received signal and down-converts the frequency, and the like. The transceiver may receive a signal through a wireless channel, output the signal to the UE processor 1302, and transmit the signal output from the UE processor 1302 through a wireless channel. The UE processor 1302 may control a series of processes so that the UE operates according to the embodiment.

Figure 14:
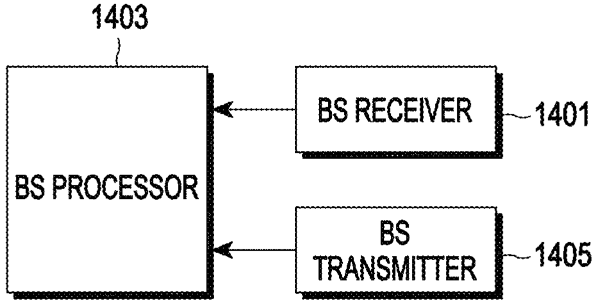
FIG. 14 illustrates a BS according to an embodiment.

FIG. 14 illustrates a BS according to an embodiment.

Referring to FIG. 14, the BS includes a BS receiver 1401, a BS transmitter 1405, and a BS processor 1403. The BS receiver 1401 and the BS transmitter 1405 may be collectively referred to as a transceiver in the embodiment. The transceiver may transmit and receive a signal to/from the UE. The signal may include control information and data. To this end, the transceiver may include an RF transmitter that up-converts and amplifies a frequency of a transmitted signal, an RF receiver that low-noise amplifies a received signal and down-converts the frequency, and the like. The transceiver may receive a signal through a wireless channel, output the signal to the BS processor 1403, and transmit the signal output from the BS processor 1403 through a wireless channel. The BS processor 1403 may control a series of processes so that the BS operates according to the embodiment.

Figure 15:
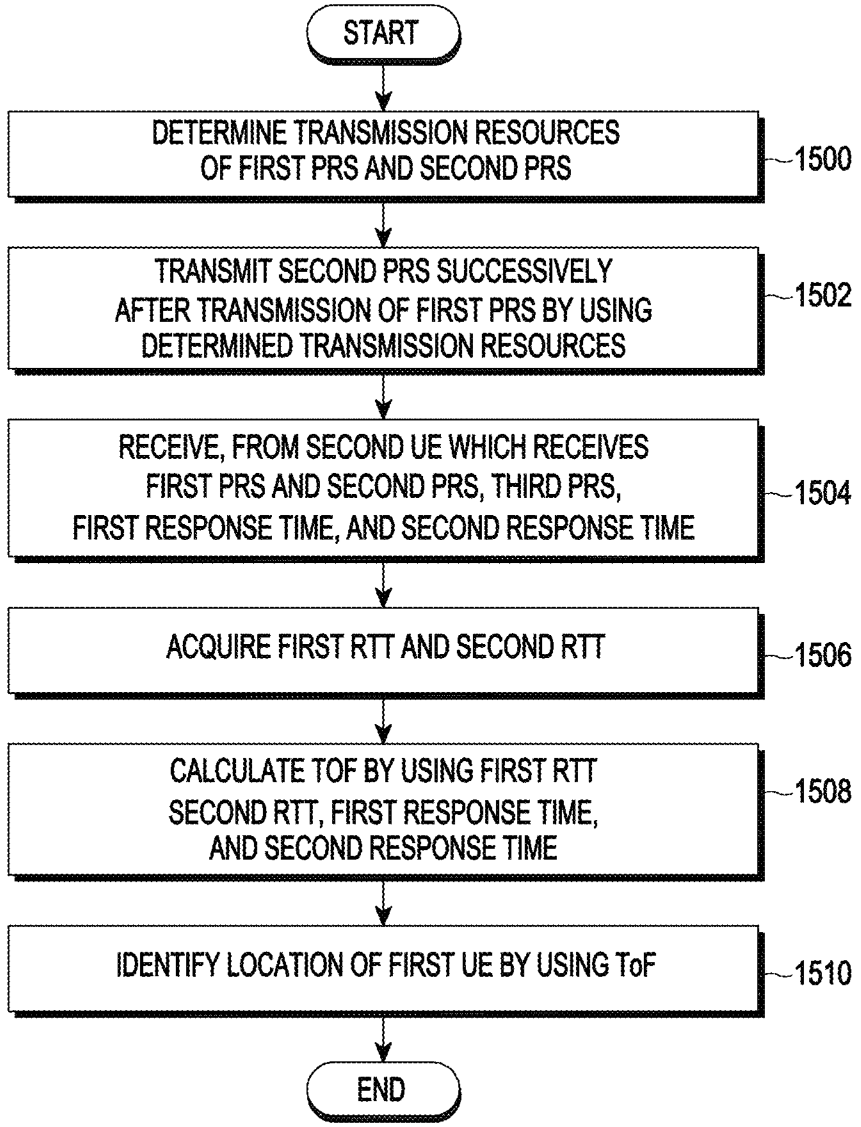
FIG. 15 illustrates a method performed by an SL communication UE identifying a location by using a PRS according to an embodiment.

FIG. 15 illustrates a method by which an SL communication UE identifies a location by using a PRS according to an embodiment.

The method of FIG. 15 is described with reference to UE-A described in FIGS. 8 and 10.

A first UE performing SL communication may determine transmission resources of a first PRS and transmission resources of a second PRS in step 1500. The determined transmission resources of the first PRS and the second PRS may be allocated by the BS, and may be received by DCI, Uu-RRC, or a higher-layer signal through a positioning protocol or may be allocated by the first UE.

The first UE may transmit the first RPS by using at least one of the determined transmission resources and successively transmit the second PRS in step 1502. The successive transmission may indicate that the first UE transmits the second PRS after transmission of the first PRS and before reception of the third PRS from the second UE. The first PRS and the second PRS transmitted by the first UE may be transmitted to the second UE in a unicast manner or may be transmitted to a plurality of UEs in a groupcast or broadcast manner. When transmitting the first PRS or the second PRS, the first UE may also transmit an RTT perform request to the second UE through SCI.

The first UE may receive the third PRS from the second UE receiving the first PRS and the second PRS in step 1504. The first UE may receive a first response time corresponding to a difference between a time point at which the first PRS is received and a time point at which the third PRS is transmitted and a second response time corresponding to a difference between a time point at which the second PRS is received and a time point at which the third PRS is transmitted from the second UE.

The first UE may acquire a first RTT corresponding to a difference between a time point at which the first PRS is transmitted and a time point at which the third PRS is received and a second RTT corresponding to a difference between a time point at which the second PRS is transmitted and a time point at which the third PRS is received in step 1506.

The first UE may calculate the ToF by using the first RTT, the second RTT, the first response time, and the second response time in step 1508. Specifically, the ToF may be calculated by Equation (5) or Equation (9). When Equation (9) is used, a correction coefficient may be calculated using the first RTT, the second RTT, the first response time, and the second response time, and the ToF may be calculated through the correction coefficient.

The first UE may identify the location of the first UE by using the calculated ToF in step 1510.

Figure 16:
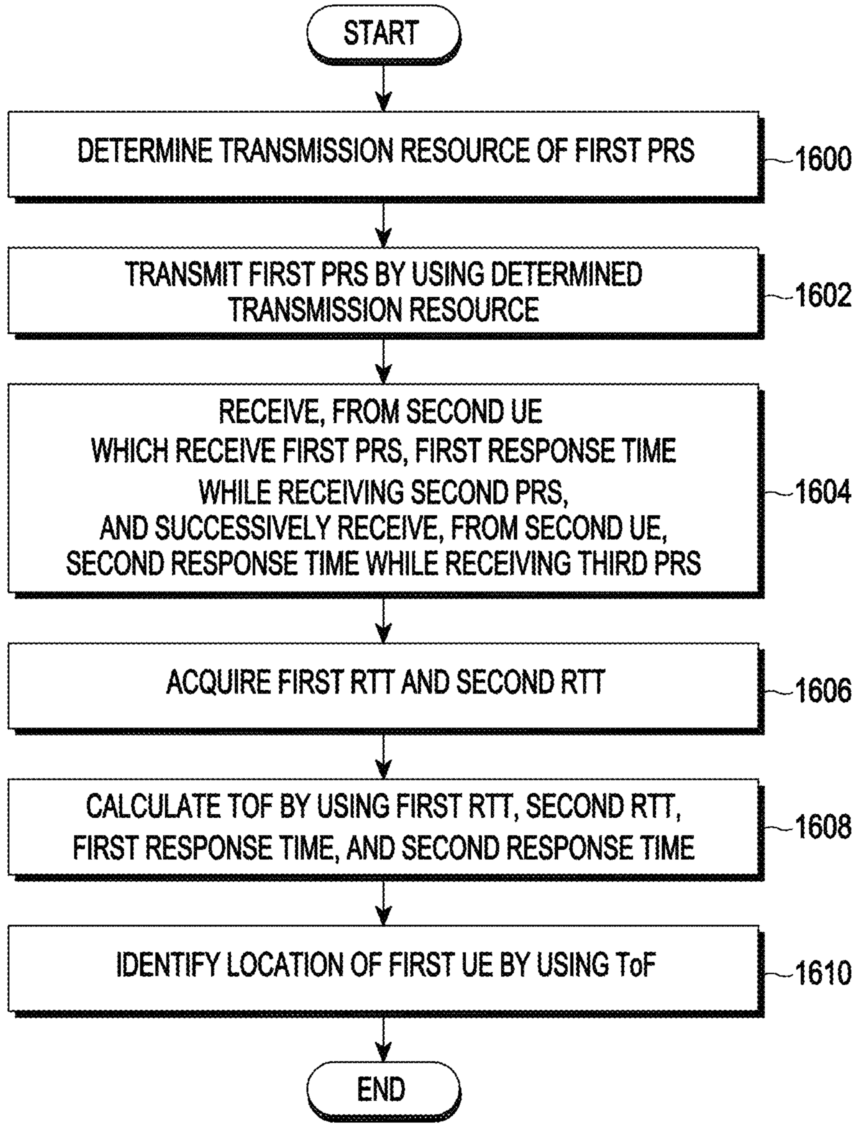
FIG. 16 illustrates a method performed by an SL communication UE identifying a location by using a PRS according to an embodiment.

FIG. 16 illustrates a method by which an SL communication UE identifies a location by using a PRS according to an embodiment.

The method of FIG. 16 is described with reference to UE-A described in FIGS. 9 and 11.

A first UE performing SL communication may determine transmission resources of a first PRS in step 1600. The determined transmission resources of the first PRS may be allocated by the BS, and may be received by DCI, Uu-RRC, or a higher-layer signal through a positioning protocol or may be allocated by the first UE.

The first UE may transmit the first PRS by using the determined transmission resources in step 1602. The first PRS transmitted by the first UE may be transmitted to the second UE in a unicast manner or may be transmitted to a plurality of UEs in a groupcast or broadcast manner. When transmitting the first PRS, the first UE may also transmit an RTT perform request to the second UE through SCI.

The first UE may receive the second PRS from the second UE receiving the first PRS in step 1604. The first UE may receive a third PRS successively with the second PRS from the second UE. The first UE may receive a first response time corresponding to a difference between a time point at which the first PRS is received and a time point at which the second PRS is transmitted from the second UE together with the second PRS. The first UE may receive a second response time corresponding to a difference between a time point at which the first PRS is received and a time point at which the third PRS is transmitted from the second UE together with the third PRS. The successive reception may indicate that the first UE receives the second PRS after transmission of the first PRS and before reception of the third PRS.

The first UE may acquire a first RTT corresponding to a difference between a time point at which the first PRS is transmitted and a time point at which the second PRS is received and a second RTT corresponding to a difference between a time point at which the first PRS is transmitted and a time point at which the third PRS is received in step 1606.

The first UE may calculate the ToF by using the first RTT, the second RTT, the first response time, and the second response time in step 1608. Specifically, the ToF may be calculated by Equation (5) or Equation (10). When Equation (10) is used, a correction coefficient may be calculated using the first RTT, the second RTT, the first response time, and the second response time, and the ToF may be calculated through the correction coefficient.

The first UE may identify the location of the first UE by using the calculated ToF in step 1610.

Herein, each block of the flowchart illustrations, and combinations of blocks in the flowchart illustrations, can be implemented by computer program instructions. These computer program instructions can be provided to a processor of a general-purpose computer, special purpose computer, or other programmable data processing apparatus to produce a machine, such that the instructions, which execute via the processor of the computer or other programmable data processing apparatus, create means for implementing the functions specified in the flowchart block or blocks. These computer program instructions may also be stored in a computer usable or computer-readable memory that can direct a computer or other programmable data processing apparatus to function in a particular manner, such that the instructions stored in the computer usable or computer-readable memory produce an article of manufacture including instruction means that implement the function specified in the flowchart block or blocks. The computer program instructions may also be loaded onto a computer or other programmable data processing apparatus to cause a series of operational steps to be performed on the computer or other programmable apparatus to produce a computer implemented process such that the instructions that execute on the computer or other programmable apparatus provide steps for implementing the functions specified in the flowchart block or blocks.

Furthermore, each block of the flowchart illustrations may represent a module, segment, or portion of code, which includes one or more executable instructions for implementing the specified logical function(s). It should also be noted that in some alternative implementations, the functions noted in the blocks may occur out of order. For example, two blocks shown in succession may in fact be executed substantially concurrently or the blocks may sometimes be executed in the reverse order, depending upon the functionality involved.

While the disclosure has been illustrated and described with reference to various embodiments of the present disclosure, those skilled in the art will understand that various changes can be made in form and detail without departing from the spirit and scope of the present disclosure as defined by the appended claims and their equivalents.

What is claimed is:

1. A method of identifying a location by using a positioning reference signal (PRS) by a first user equipment (UE) performing sidelink (SL) communication, the method comprising:

transmitting a first PRS;

transmitting a second PRS, after transmitting the first PRS;

receiving, from a second UE which received the first PRS and the second PRS, a third PRS, a first response time corresponding to a difference between a time point at which the first PRS is received and a time point at which the third PRS is transmitted, and a second response time corresponding to a difference between a time point at which the second PRS is received and a time point at which the third PRS is transmitted;

acquiring a first round trip time (RTT) corresponding to a difference between a time point at which the first PRS is transmitted and a time point at which the third PRS is received, and a second RTT corresponding to a difference between a time point at which the second PRS is transmitted and a time point at which the third PRS is received;

calculating a time of flight (ToF) using the following equations;

$$\delta = \frac{T_{round2} - T_{round1}}{T_{reply2} - T_{reply1}} \text{ and}$$

$$ToF = \frac{1}{2}(T_{round1} - \delta \cdot T_{reply1}).$$

where δ is a correction coefficient, $T_{round1}$ is the first RTT, $T_{round2}$ is the second RTT, $T_{reply1}$ is the first response time, and $T_{reply2}$ is the second response time; and identifying the location of the first UE based on the calculated ToF.

2. The method of claim 1, further comprising:

receiving information indicating transmission resources of the first PRS and the second PRS allocated by a base station (BS) through downlink control information (DCI), Uu-radio resource control (RRC), or a higher-layer signal through a positioning protocol, or allocating, but the first UE, the transmission resources of the first PRS and the second PRS.

3. The method of claim 1, further comprising:

transmitting an RTT perform request to the second UE through SL control information (SCI) while the first PRS or the second PRS is transmitted.

4. A method of identifying a location by using a positioning reference signal (PRS) by a first user equipment (UE) performing sidelink (SL) communication, the method comprising:

transmitting a first PRS;

receiving, from a second UE which received the first PRS, a second PRS and a first response time corresponding to a difference between a time point at which the first PRS is received and a time point at which the second PRS is transmitted;

receiving, from the second UE, a third PRS and a second response time corresponding to a difference between a time point at which the first PRS is received and a time point at which the third PRS is transmitted, after receiving the second PRS;

acquiring a first round trip time (RTT) corresponding to a difference between a time point at which the first PRS is transmitted and a time point at which the second PRS is received, and a second RTT corresponding to a difference between the time point at which the first PRS is transmitted and a time point at which the third PRS is received;

calculating a time of flight (ToF) using the following equations:

$$\delta = \frac{T_{round2} - T_{round1}}{T_{reply2} - T_{reply1}} \text{ and}$$

$$ToF = \frac{1}{2}(T_{round1} - \delta \cdot T_{reply1}).$$

where δ is a correction coefficient, $T_{round1}$ is the first RTT, $T_{round2}$ is the second RTT, $T_{reply1}$ is the first response time, and $T_{reply2}$ is the second response time; and identifying the location of the first UE based on the calculated ToF.

5. The method of claim 4, receiving information indicating transmission resource of the first PRS allocated by a base station (BS) through downlink control information (DCI), Uu-radio resource control (RRC), or a higher-layer signal through a positioning protocol, or allocating, by the first UE, the transmission resource of the first PRS.

6. The method of claim 4, further comprising transmitting an RTT perform request to the second UE through SL control information (SCI) while the first PRS is transmitted.

7. A first user equipment (UE) identifying a location by using a sidelink (SL) positioning reference signal (PRS), the first UE comprising:

a transceiver; and a processor coupled to the transceiver, wherein the processor is configured to:

transmit a first PRS, transmit a second PRS, after transmitting the first PRS, receive, from a second UE which received the first PRS and the second PRS, a third PRS, a first response time corresponding to a difference between a time point at which the first PRS is received and a time point at which the third PRS is transmitted, and a second response time corresponding to a difference between a time point at which the second PRS is received and a time point at which the third PRS is transmitted, acquire a first round trip time (RTT) corresponding to a difference between a time point at which the first PRS is transmitted and a time point at which the third PRS is received, and a second RTT corresponding to a difference between a time point at which the second PRS is transmitted and a time point at which the third PRS is received, calculate a time of flight (ToF) using the following equations;

$$\delta = \frac{T_{round2} - T_{round1}}{T_{reply2} - T_{reply1}} \text{ and}$$

$$ToF = \frac{1}{2}(T_{round1} - \delta \cdot T_{reply1}).$$

where δ is a correction coefficient, $T_{round1}$ is the first RTT, $T_{round2}$ is the second RTT, $T_{reply1}$ is the first response time, and $T_{reply2}$ is the second response time, and identify the location of the first UE based on the calculated ToF.

8. The first UE of claim 7, wherein the processor is further configured to:

receive information indicating transmission resources of the first PRS and the second PRS allocated by a base station (BS) through downlink control information (DCI), Uu-radio resource control (RRC), or a higher-layer signal through a positioning protocol, or allocate the transmission resources of the first PRS and the second PRS.

9. The first UE of claim 7, wherein the processor is further configured to transmit an RTT perform request to the second UE through SL control information (SCI) while the first PRS or the second PRS is transmitted.

10. A first user equipment (UE) identifying a location by using a sidelink (SL) positioning reference signal (PRS), the first UE comprising:

a transceiver; and a processor, wherein the processor is configured to control the transceiver to:

transmit a first PRS, receive, from a second UE which received the first PRS, a second PRS and a first response time corresponding to a difference between a time point at which the first PRS is received and a time point at which the second PRS is transmitted, receive, from the second UE, a third PRS and a second response time corresponding to a difference between a time point at which the first PRS is received and a time point at which the third PRS is transmitted, after receiving the second PRS, acquire a first round trip time (RTT) corresponding to a difference between a time point at which the first PRS is transmitted and a time point at which the second PRS is received, and a second RTT corresponding to a difference between the time point at which the first PRS is transmitted and a time point at which the third PRS is received, calculate a time of flight (ToF) using the following equations;

$$\delta = \frac{T_{round2} - T_{round1}}{T_{reply2} - T_{reply1}} \text{ and}$$

$$ToF = \frac{1}{2}(T_{round1} - \delta \cdot T_{reply1}).$$

where δ is a correction coefficient, $T_{round1}$ is the first RTT, $T_{round2}$ is the second RTT, $T_{reply1}$ is the first response time, and $T_{reply2}$ is the second response time, and identify the location of the first UE based on the calculated ToF.

11. The first UE of claim 10, wherein the processor is further configured to:

receive information indicating transmission resource of the first PRS is allocated by a base station (BS) through downlink control information (DCI), Uu-radio resource control (RRC), or a higher-layer signal through a positioning protocol, or allocate the transmission resource of the first PRS.

12. The first UE of claim 10, wherein the processor is further configured to transmit an RTT perform request to the second UE through SL control information (SCI) while the first PRS is transmitted.

* * * * *